Oct. 31, 1939.   J. W. BRYCE   2,178,064
SLIDING SCALE MULTIPLYING MACHINE
Filed July 12, 1932   20 Sheets-Sheet 1

INVENTOR
James W. Bryce
BY
Cooper, Kerr & Dunham
ATTORNEYS

Oct. 31, 1939.  J. W. BRYCE  2,178,064
SLIDING SCALE MULTIPLYING MACHINE
Filed July 12, 1932  20 Sheets-Sheet 2
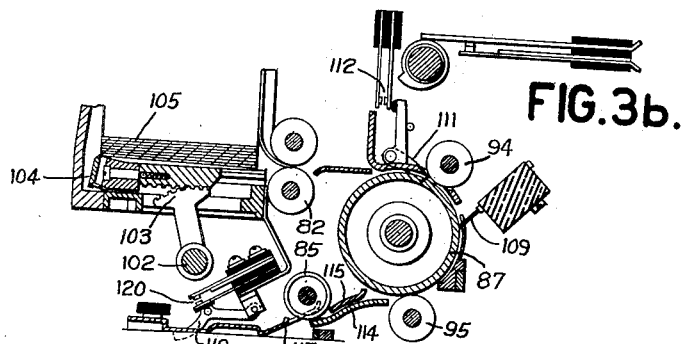
FIG.3b.
FIG.3.
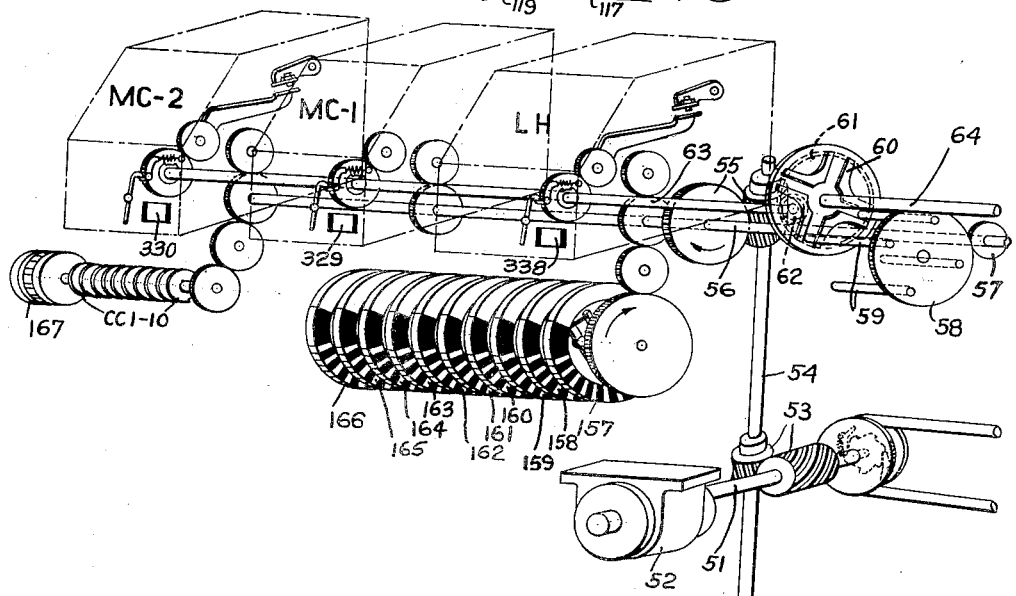
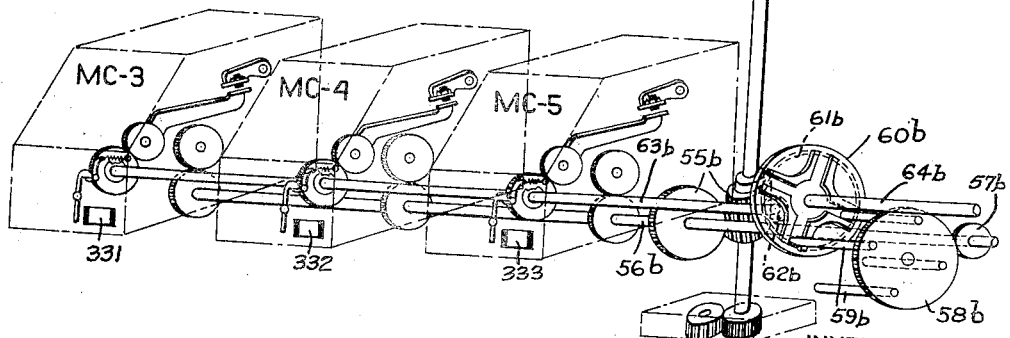
INVENTOR
James W. Bryce
BY
Cooper, Kerr & Dunham
ATTORNEYS

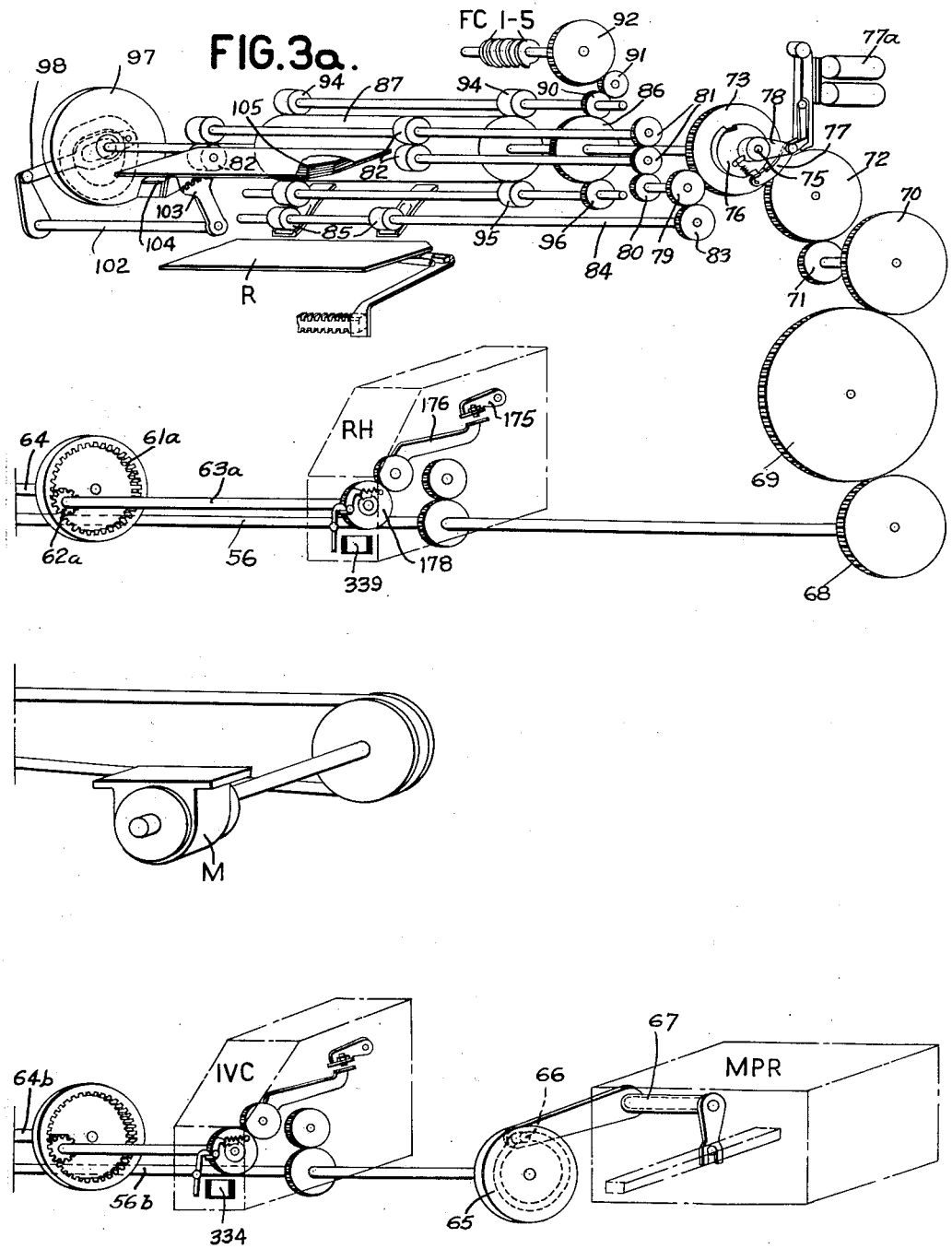

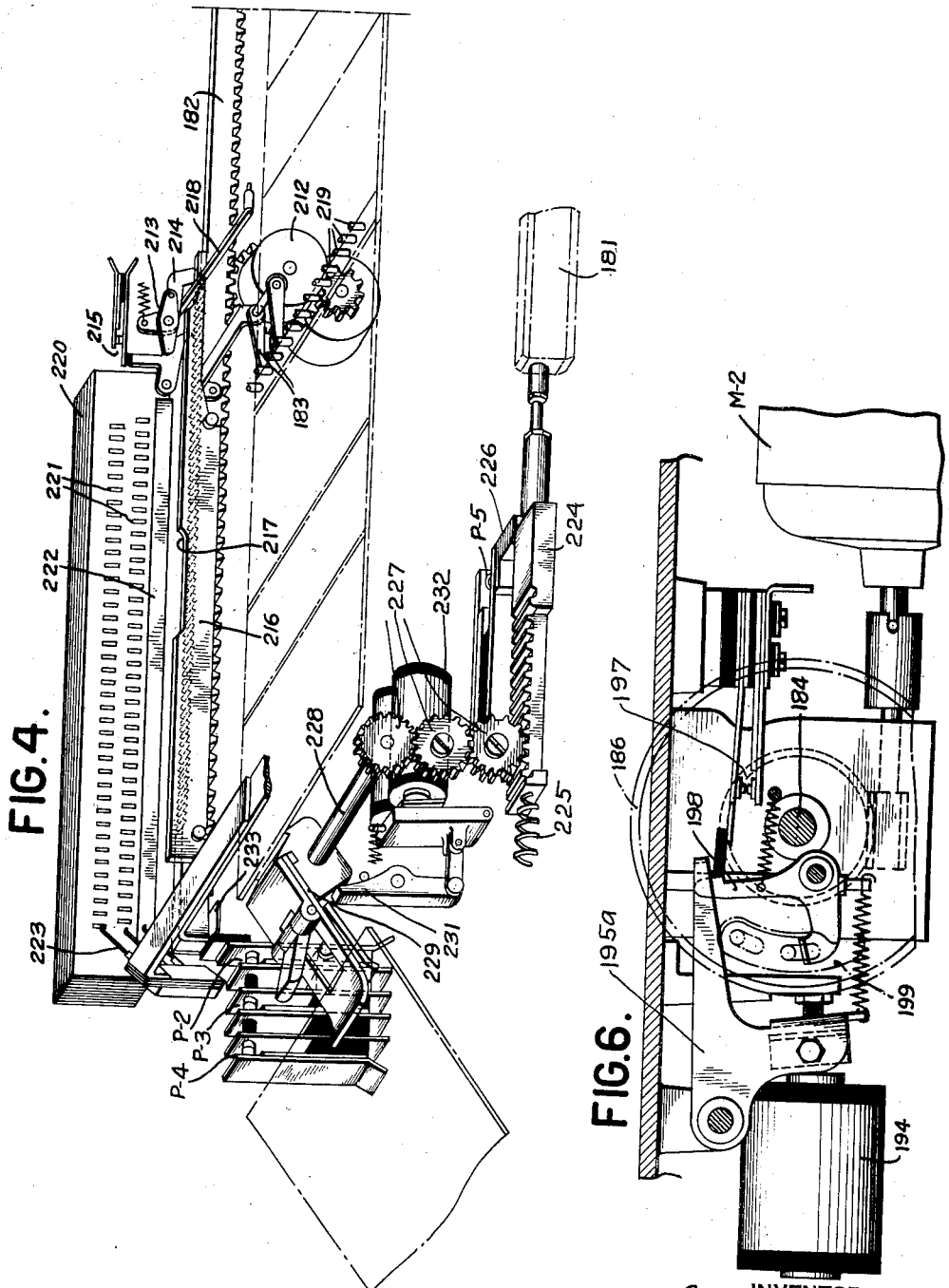

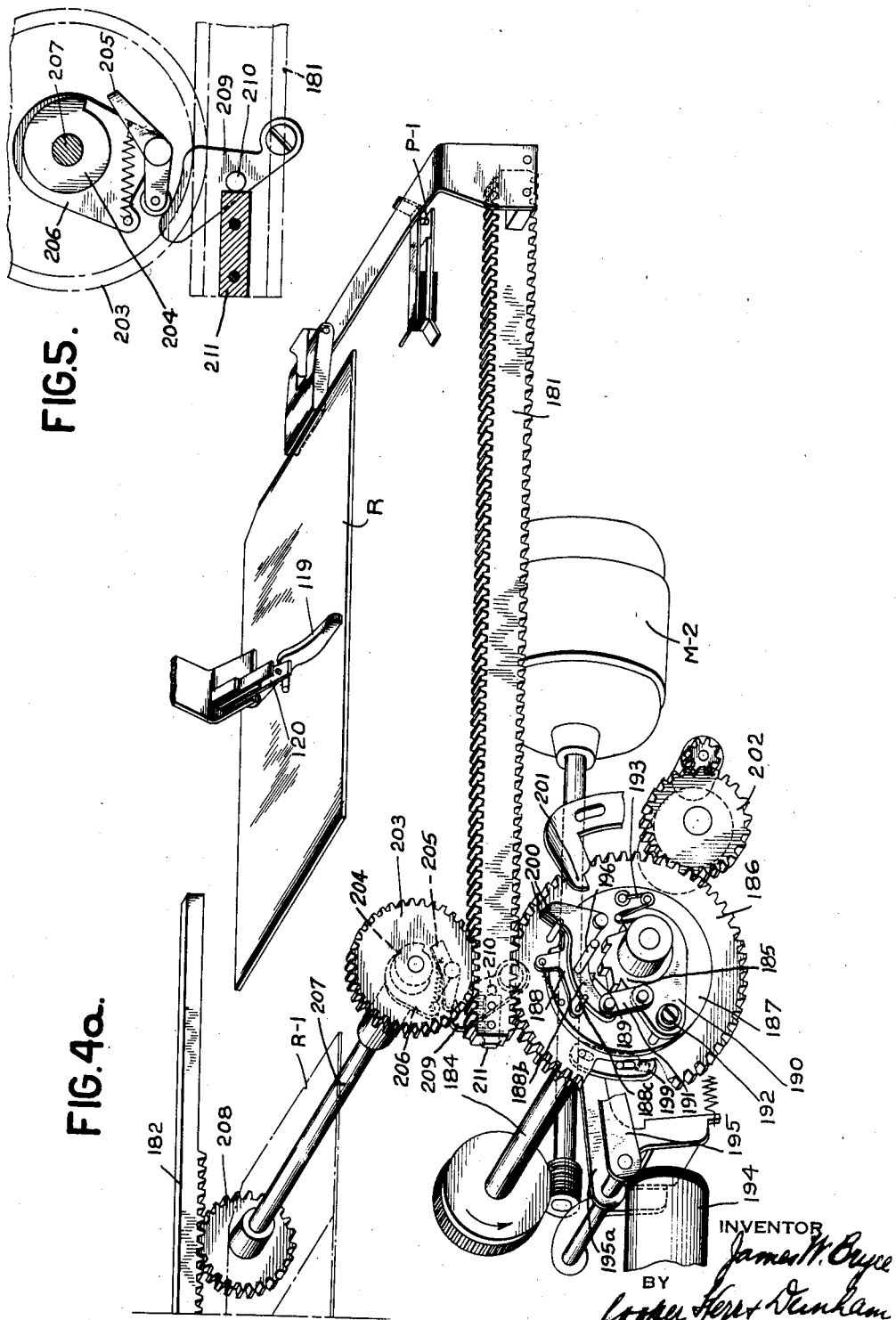

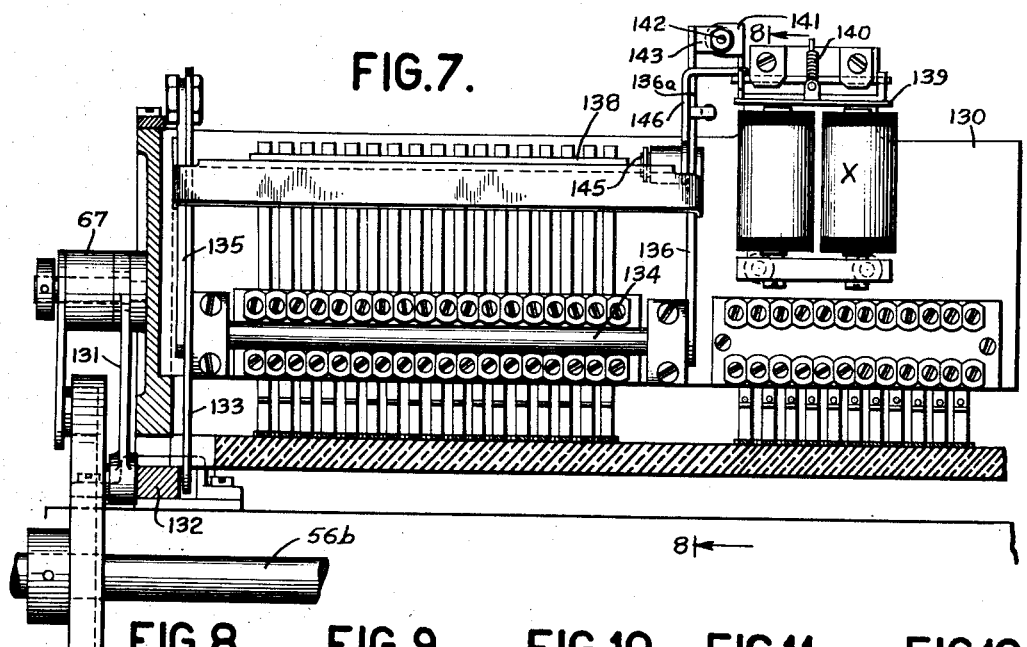

Oct. 31, 1939.     J. W. BRYCE     2,178,064
SLIDING SCALE MULTIPLYING MACHINE
Filed July 12, 1932     20 Sheets-Sheet 7
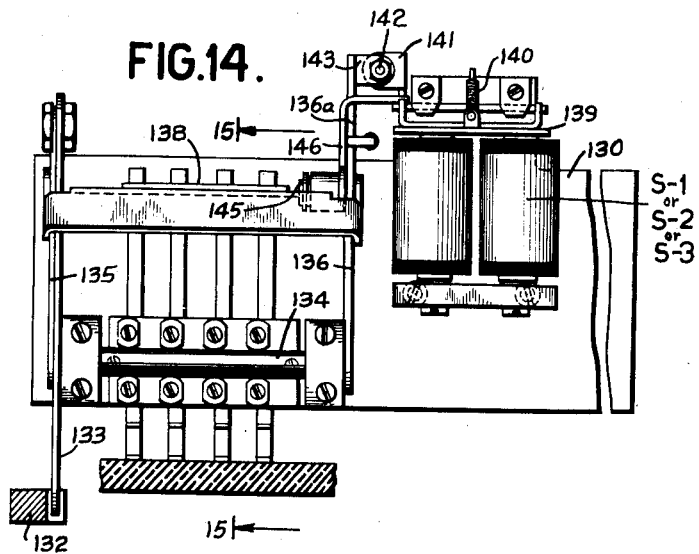
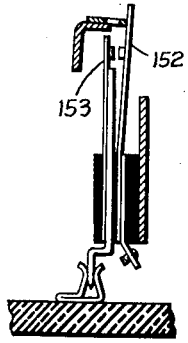
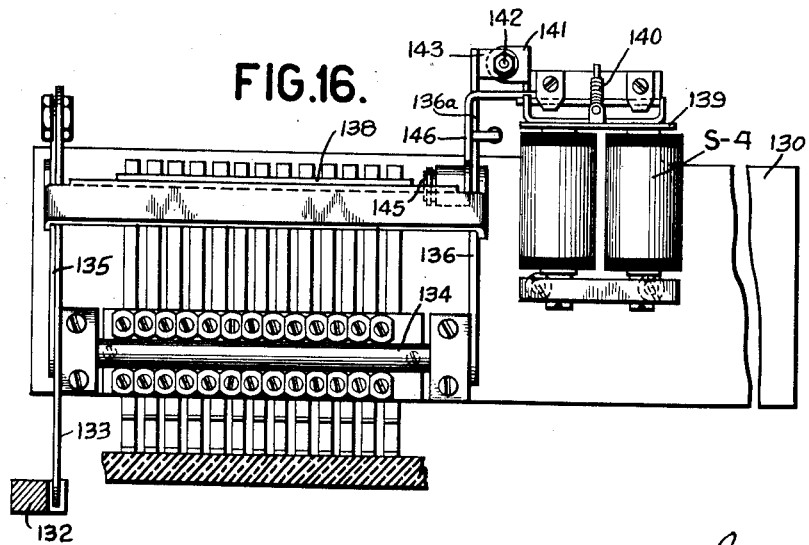
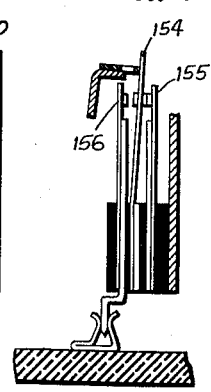
James W. Bryce
INVENTOR
BY Cooper, Kerr & Dunham
ATTORNEYS Oct. 31, 1939.　　　　J. W. BRYCE　　　　2,178,064
SLIDING SCALE MULTIPLYING MACHINE
Filed July 12, 1932　　　20 Sheets-Sheet 8
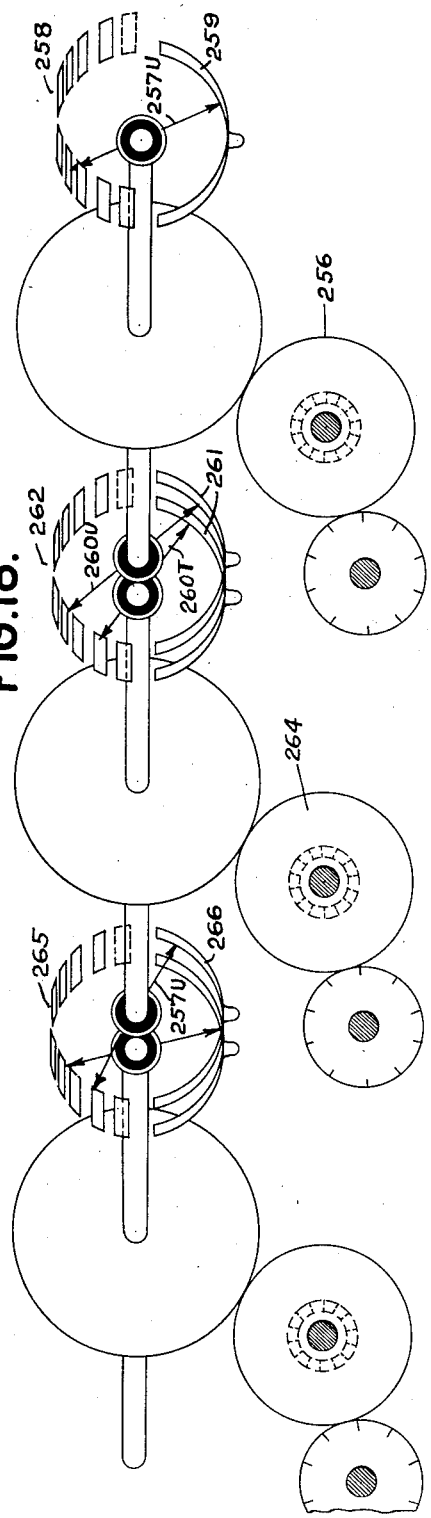
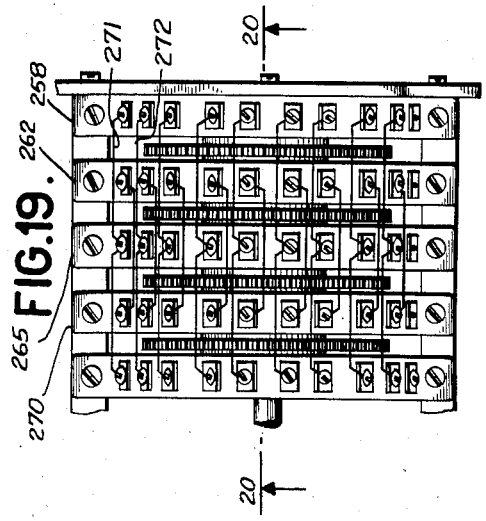
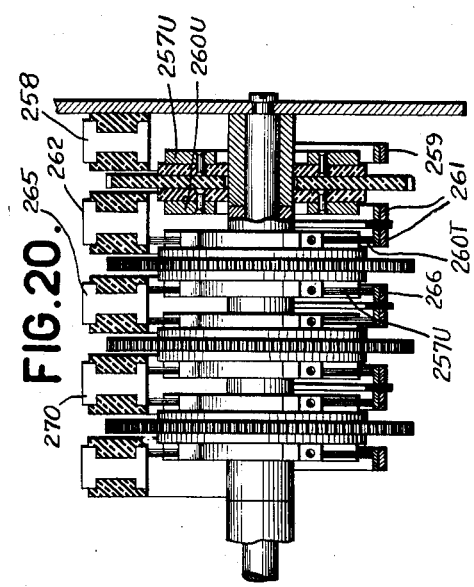
James W. Bryce
INVENTOR
BY Cooper, Kerr & Dunham
ATTORNEYS Oct. 31, 1939.   J. W. BRYCE   2,178,064
SLIDING SCALE MULTIPLYING MACHINE
Filed July 12, 1932   20 Sheets-Sheet 9
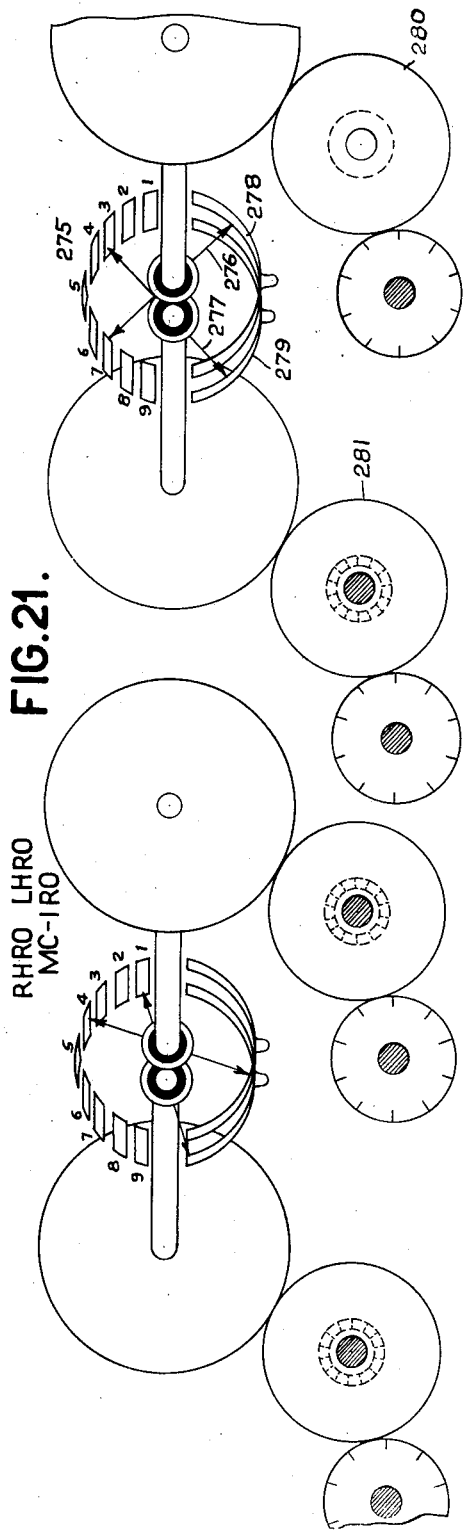
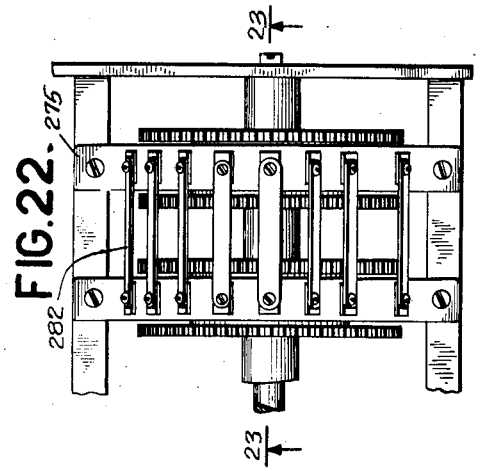
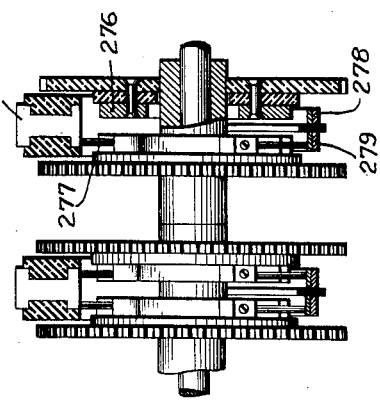
James W. Bryce
INVENTOR
BY Cooper, Kerr & Dunham
ATTORNEYS Oct. 31, 1939.  J. W. BRYCE  2,178,064
SLIDING SCALE MULTIPLYING MACHINE
Filed July 12, 1932   20 Sheets—Sheet 10
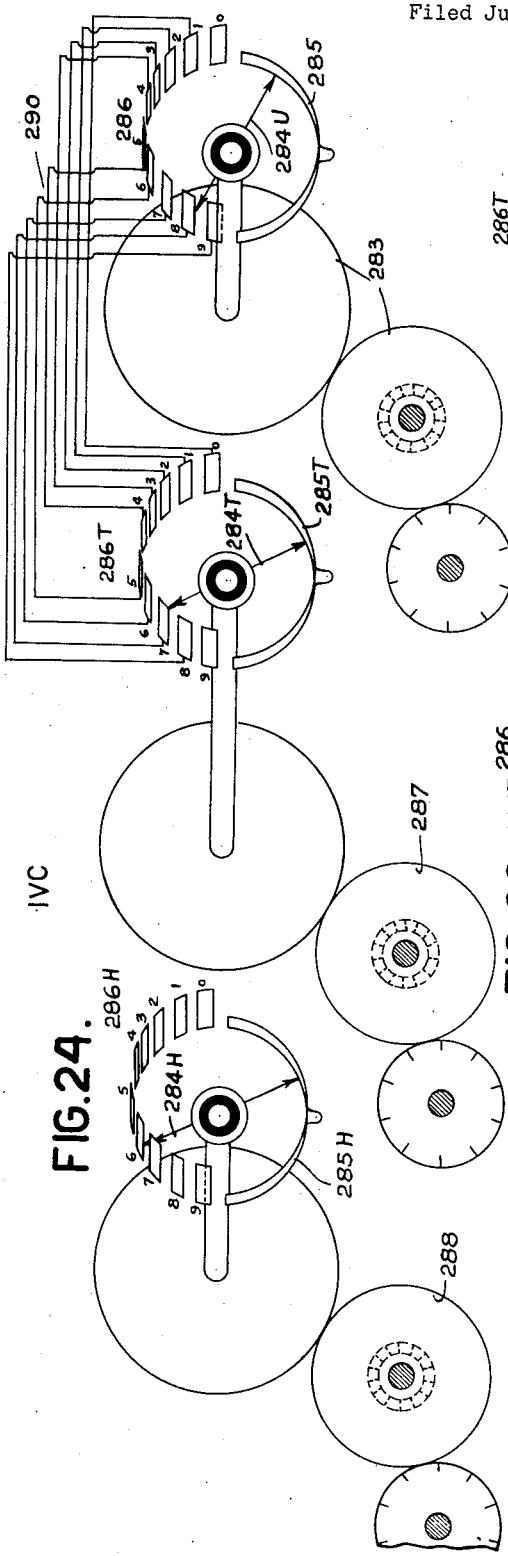
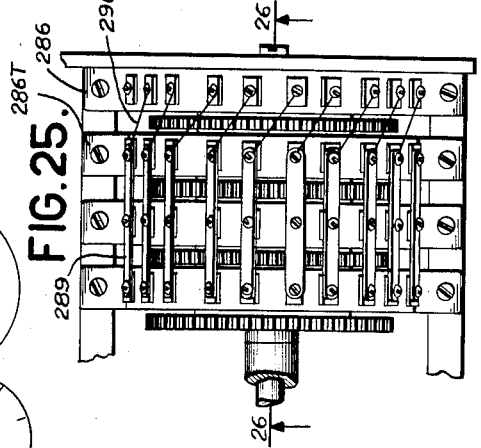
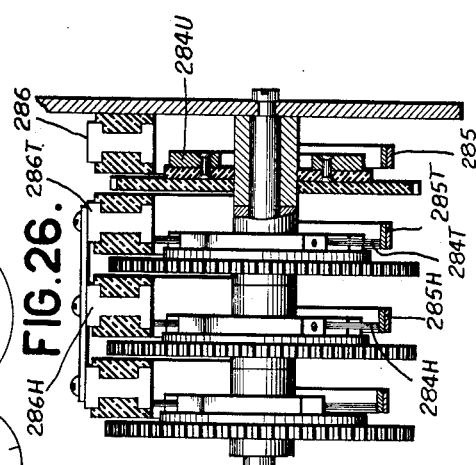
James W. Bryce
INVENTOR
BY Cooper, Kerr & Dunham
ATTORNEYS

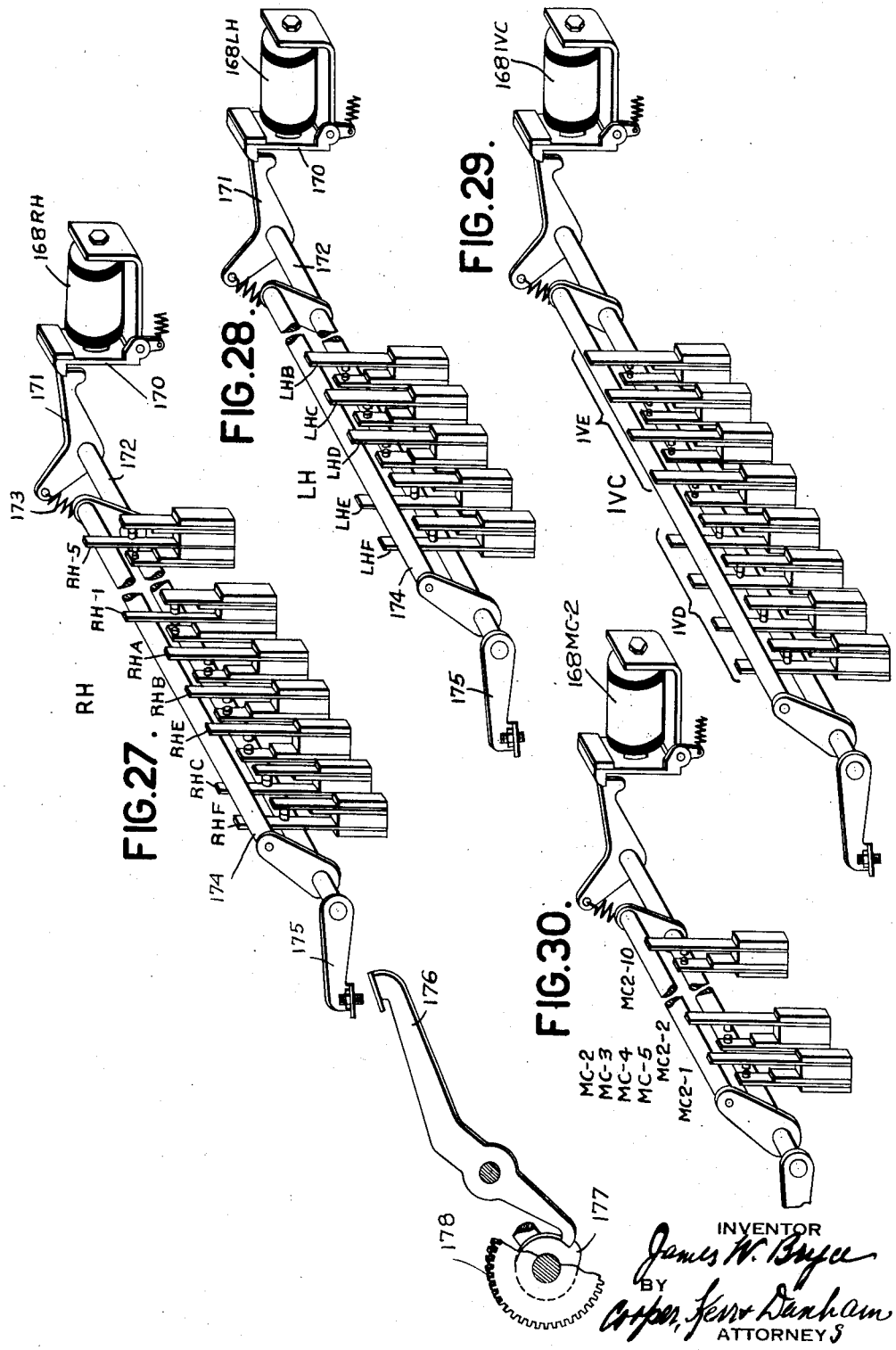

Oct. 31, 1939. J. W. BRYCE 2,178,064
SLIDING SCALE MULTIPLYING MACHINE
Filed July 12, 1932 20 Sheets-Sheet 12
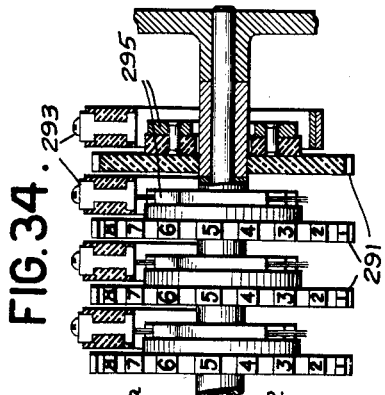
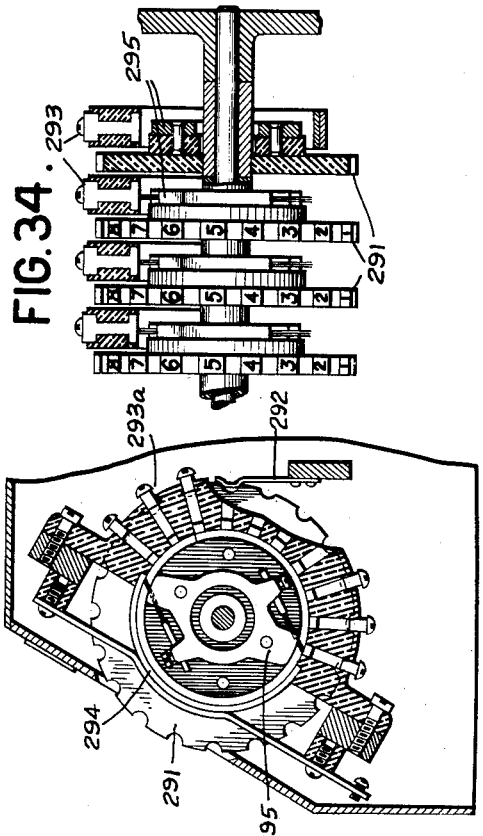
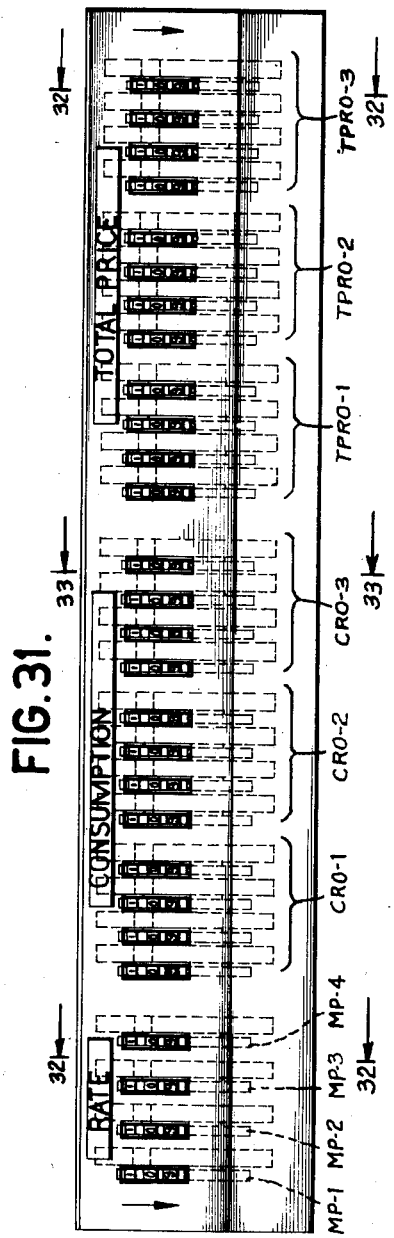
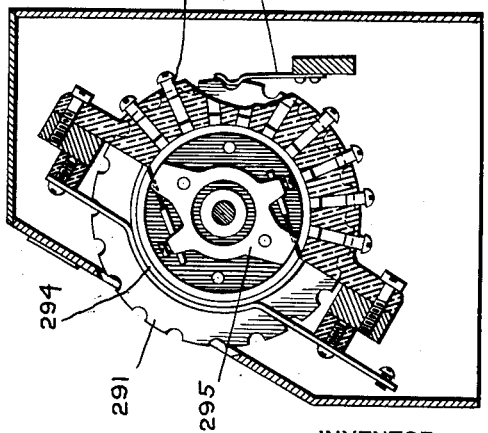
INVENTOR
James W. Bryce
BY
Cooper, Kerr & Dunham
ATTORNEYS Oct. 31, 1939.   J. W. BRYCE   2,178,064
SLIDING SCALE MULTIPLYING MACHINE
Filed July 12, 1932   20 Sheets-Sheet 14

Oct. 31, 1939.   J. W. BRYCE   2,178,064
SLIDING SCALE MULTIPLYING MACHINE
Filed July 12, 1932   20 Sheets-Sheet 15

INVENTOR
James W. Bryce
BY
Cooper, Kerr & Dunham
ATTORNEYS

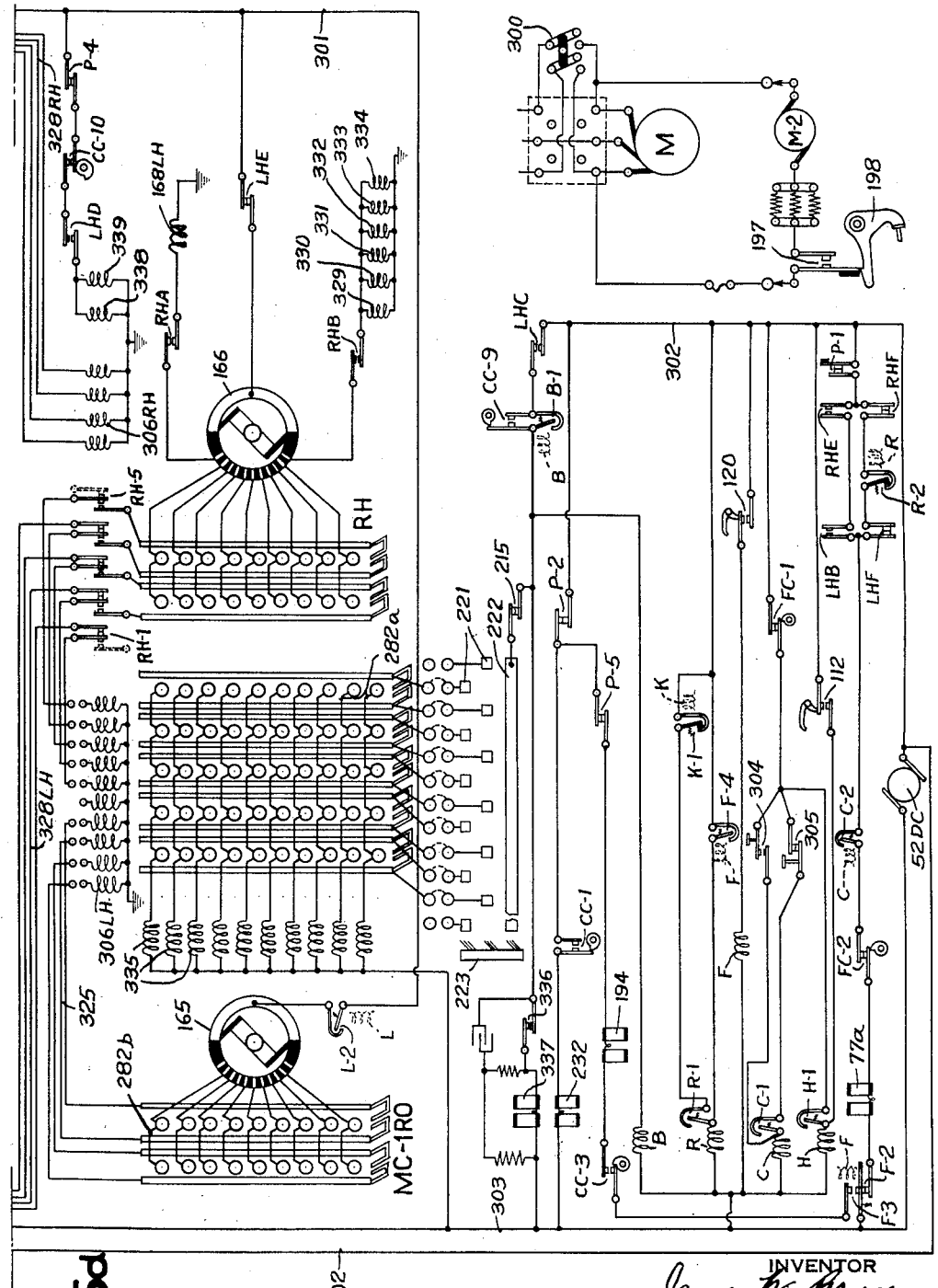

Oct. 31, 1939.     J. W. BRYCE     2,178,064
SLIDING SCALE MULTIPLYING MACHINE
Filed July 12, 1932     20 Sheets-Sheet 17
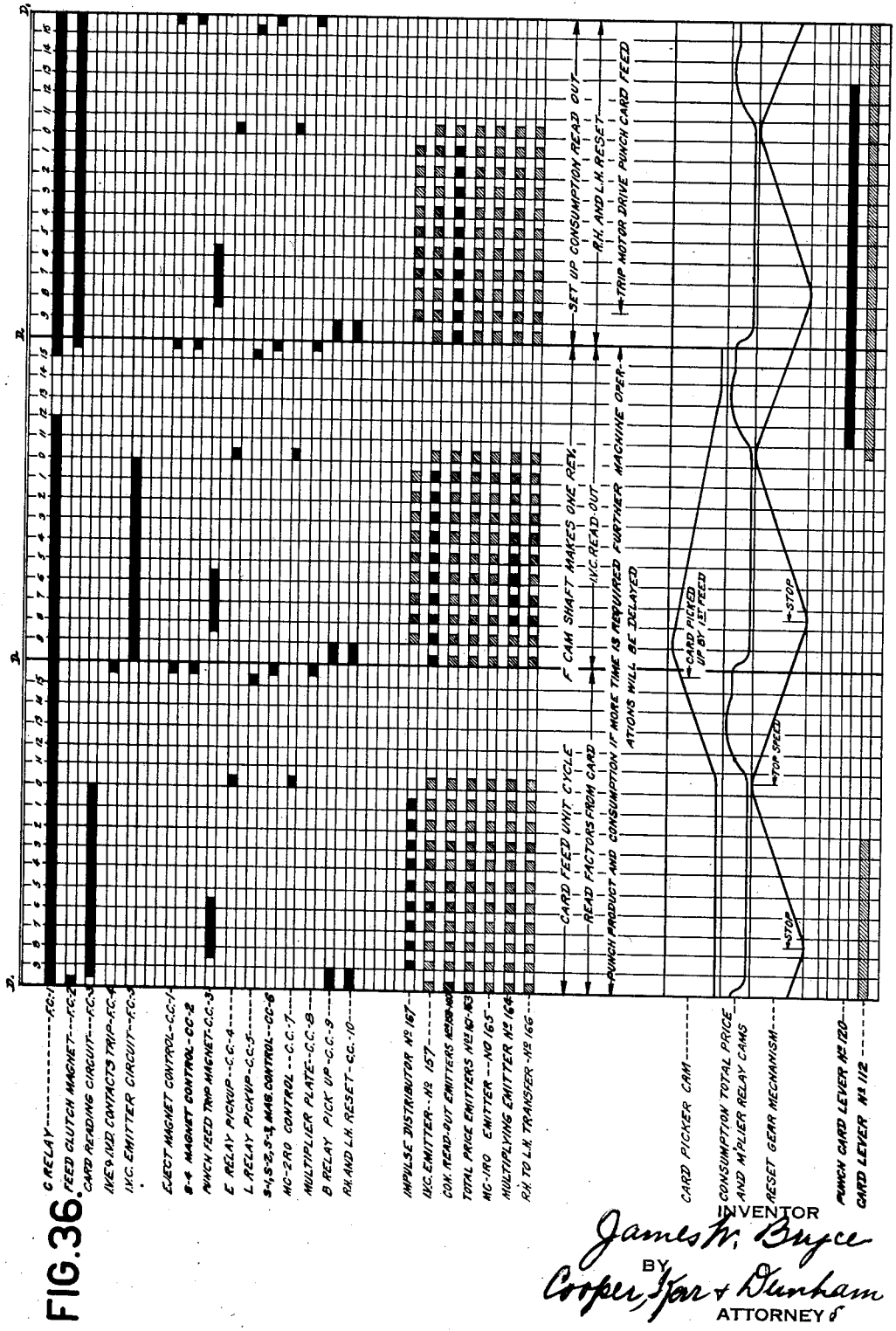

Oct. 31, 1939.   J. W. BRYCE   2,178,064
SLIDING SCALE MULTIPLYING MACHINE
Filed July 12, 1932   20 Sheets-Sheet 19

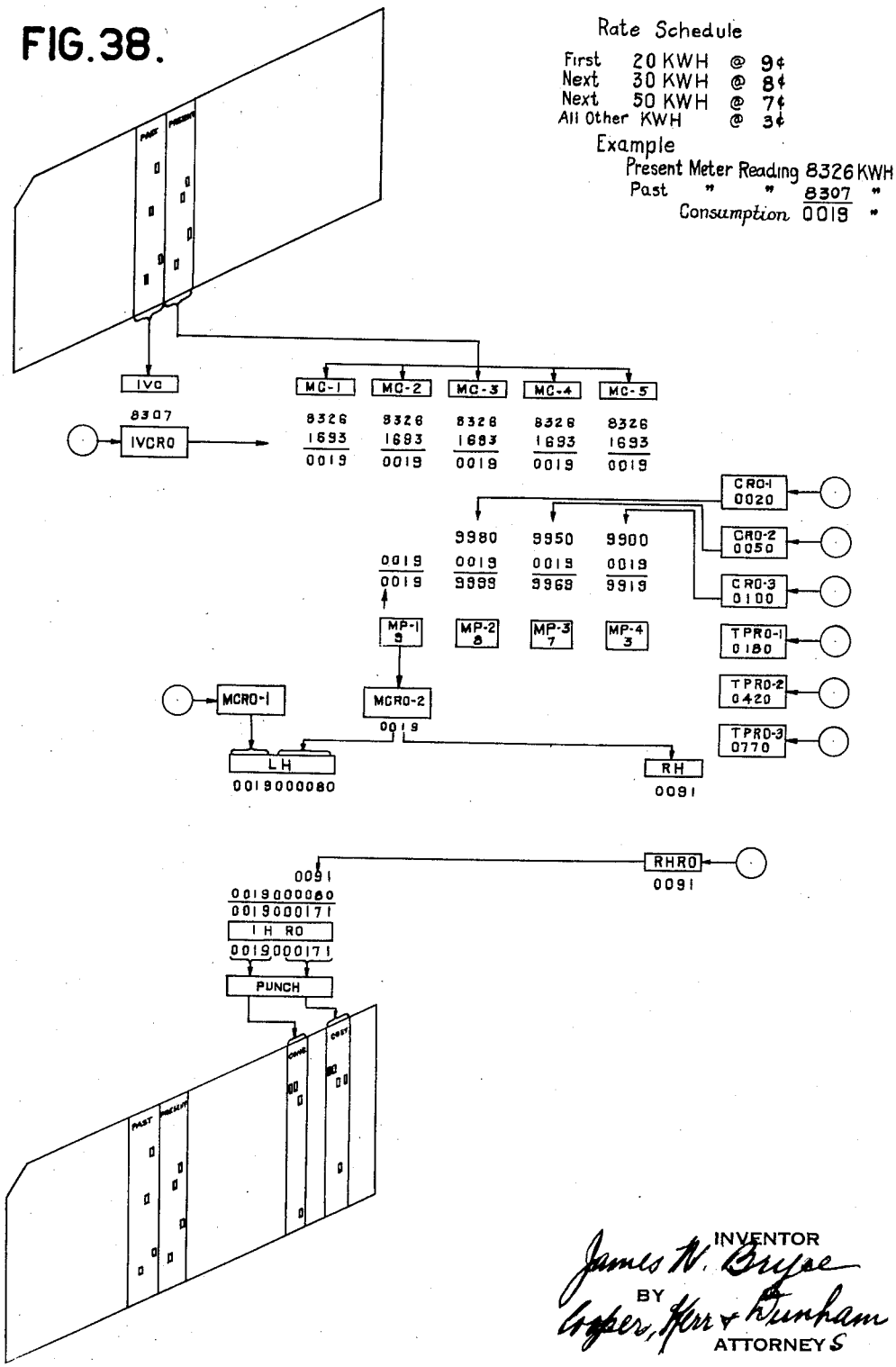

Patented Oct. 31, 1939

2,178,064

UNITED STATES PATENT OFFICE 2,178,064

SLIDING SCALE MULTIPLYING MACHINE

James W. Bryce, Bloomfield, N. J., assignor, by mesne assignments, to International Business Machines Corporation, New York, N. Y., a corporation of New York Application July 12, 1932, Serial No. 622,076

14 Claims. (Cl. 235—61.7)

This invention relates to improvements in accounting machines and more particularly relates to a machine wherein provision is made for effecting multiplication according to a sliding scale of multipliers which are to be selected and used according to the size of the multiplicand used in the computation.

In certain classes of accounting work of which public utility billing, income tax accounting, etc. are typical illustrative applications, it is desirable to provide for multiplication by a sliding scale of multipliers and to effect such multiplication according to different multipliers in accordance with the amount of the multiplicand used in the computation. For example, in certain public utility work it may be desirable to bill out electric current to a customer. On a sliding rate scale base, the first 20 kilowatt hours of consumption would be billed out at say 9¢ per kwh., the next 30 kilowatt hours might then be billed out at an 8¢ rate, the following 50 kilowatt hours might be billed out at a 7¢ rate and all over 100 kilowatt hours would be billed out at a 3¢ rate. The making out of bills and the performing of accounting operations with such involved rate schedules is both tedious and time consuming and subject to frequent errors in calculation and the present invention has for its object the provision of a machine which will enable such computations to be made rapidly and with a minimum of effort and with less liability of errors.

A further object of the present invention resides in the provision of an accounting machine wherein operations of the general sort above mentioned can be effected automatically by machine operations and without the necessity of mental calculations or adjustments during a particular computation having to be made by an operator.

A further object of the present invention resides in the provision of an accounting machine wherein accounting operations of the above general class may be performed under record card control.

A further object of the present invention resides in the provision of a machine adapted to perform the above general class of operations wherein amounts entering into the computations may be derived from a record card and the result of the complete computation introduced back upon the record from which the entries were derived.

A further object of the present invention resides in the provision of an accounting machine adapted to effect a subtraction of two entries and obtain a remainder or multiplicand and to thereafter multiply the remainder by a selected multiplier factor depending upon the size of the remainder multiplicand.

A further object of the present invention resides in the provision of an accounting machine wherein a preliminary setup may be made of a sliding scale of possible multipliers, wherein a preliminary setup may be made of a sliding scale of comparison multiplicand amounts and also wherein a preliminary setup may be made of a plurality of setup product amounts and wherein the machine will automatically ascertain through a comparison process the steps of computation which are to be performed and then selectively effect such computation.

A further object of the present invention resides in the provision of an automatic accounting machine adapted by automatic operation of the machine itself, to handle computations involving a plurality of sliding scale multipliers and to effect the selection of such multipliers in accordance with the size of the multiplicand amount which is to enter into the computation.

A further object of the present invention resides in the provision of a record controlled and record making accounting machine adapted for sliding scale multiplying operations wherein the machine is initially set up by hand according to the rate schedule to be used for a series of problems which are to be computed by the machine, and wherein subsequently the machine by automatic operation performs a sliding scale computation with data derived from a particular record, records the result back upon the record, and then automatically proceeds with a new computation from a new record with the automatic adjustment of the machine in accordance with the data derived from the new record.

Further and other objects of the present invention will be hereinafter set forth in the accompanying specification and claims and shown in the drawings which by way of illustration show what we now consider to be a preferred embodiment of the invention.

Figure 1:
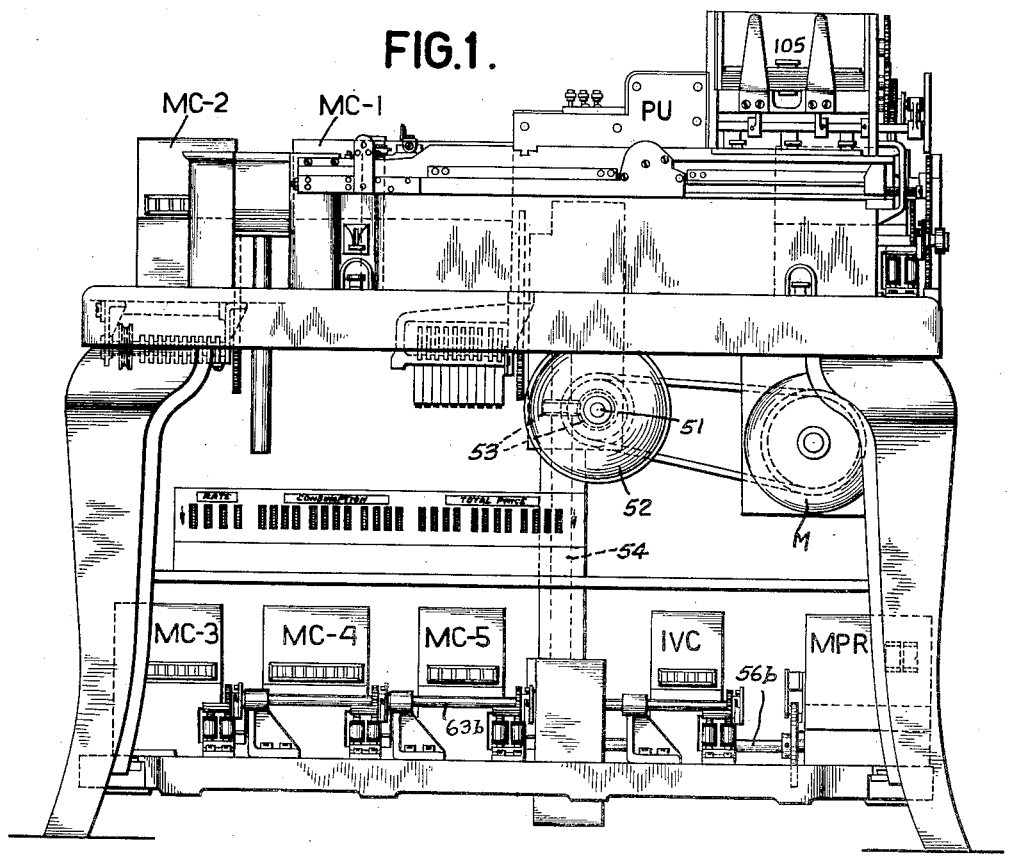
Figure 1 is a front elevational view of the machine.
Figure 36A:
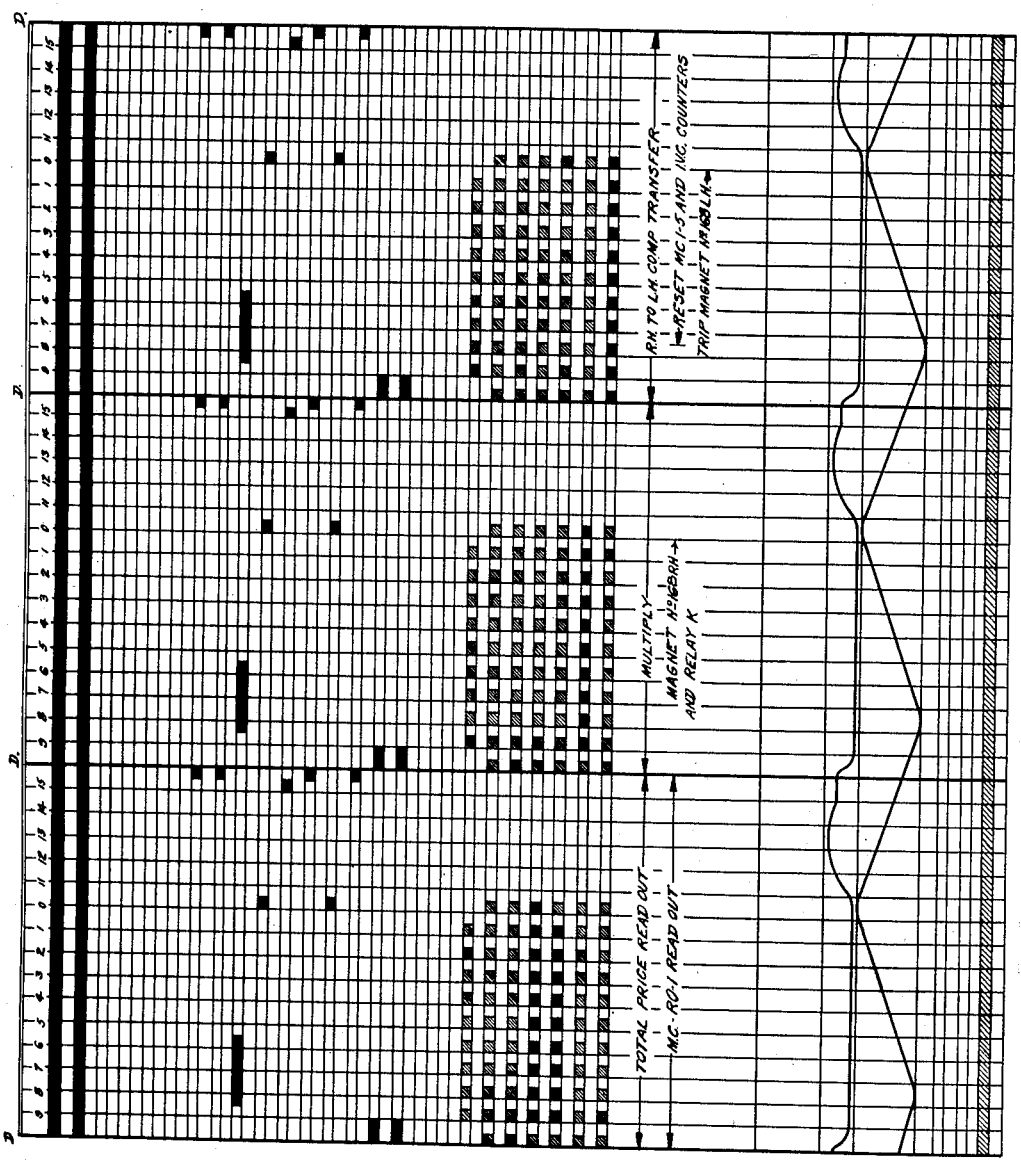
Figure 37:
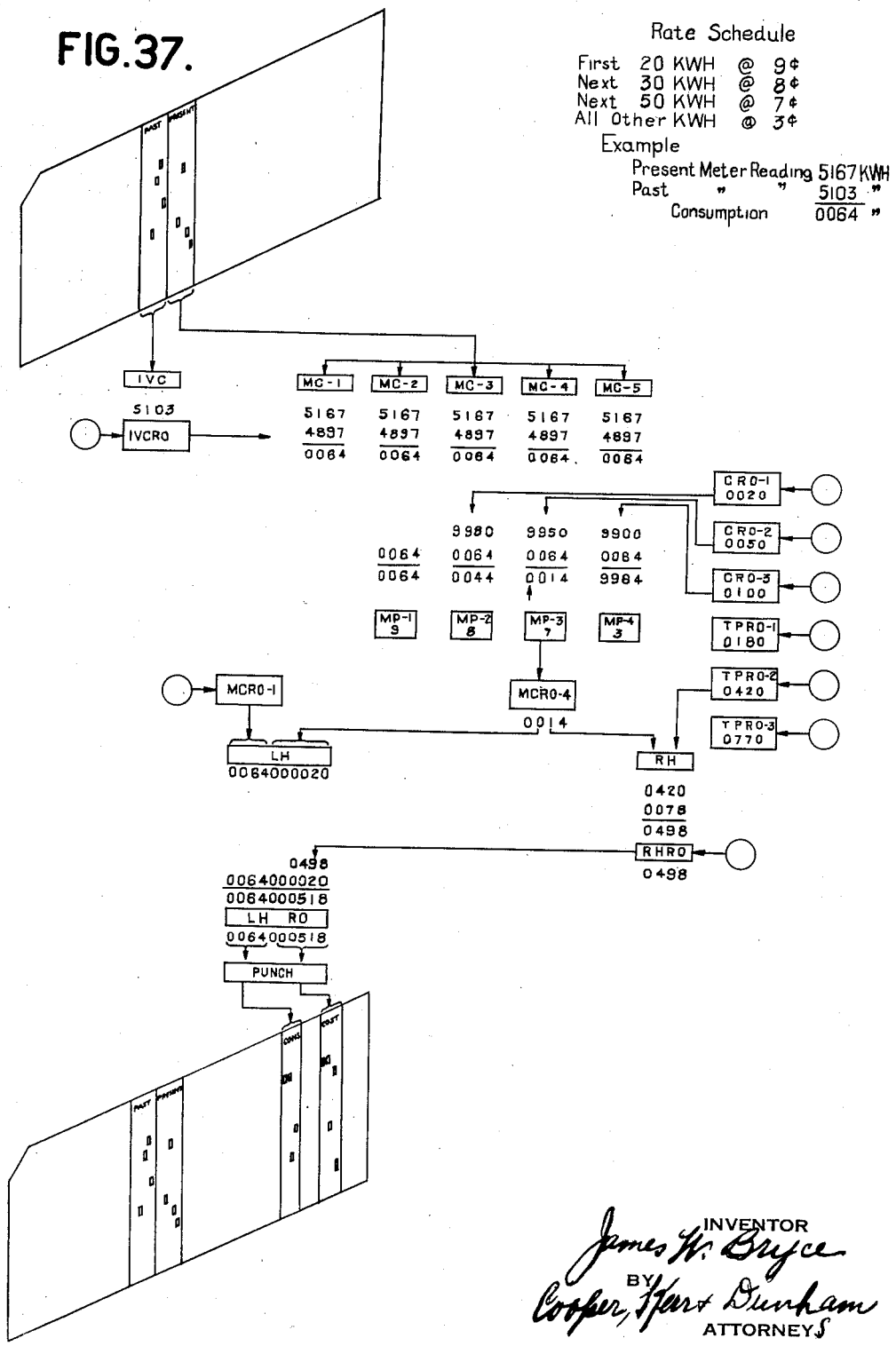

Figs. 3 and 3a, taken together, show diagrammatically the various units of the machine and the driving train therefor;

Fig. 3b is a sectional view taken through the card handling and record reading section of the machine;

Figs. 4 and 4a taken together, show an isometric view of the punching mechanism which is used in the machine;

Fig. 5 is a detail of certain parts shown in Fig. 4a;

Fig. 6 is a detail view of certain contact operating parts and contact latch devices used in the punching section of the machine;

Fig. 7 is an elevational view of the multi-contact electro-mechanical relays which are used in the machine for multiplying selection purposes;

Fig. 8 is a sectional view taken substantially on line 8—8 of Fig. 7 and showing one position of the parts in the electro-mechanical relay. This view shows the parts in the armature knockoff position;

Figs. 9 to 12 inclusive, show other positions of the relay latch parts;

Fig. 13 is a sectional view taken substantially on line 13—13 of Fig. 7 and looking in the direction of the arrows;

Fig. 14 is a fragmentary elevational view of another electro-mechanical relay device which in its general details of construction is similar to the relay shown in Fig. 7 but with a slightly modified and less number of contacts;

Fig. 15 is a detail sectional view showing the contacts of Fig. 14. The view is taken substantially on line 15—15 of Fig. 14;

Fig. 16 is an elevational view similar to Fig. 7 of another electro-mechanical relay one of which is used in the machine;

Fig. 17 shows the relay having contacts of the three-blade type;

Fig. 18 shows diagrammatically the drive and contact spots of one of the multiplicand readout devices which is used for MC—2 to MC—5 entry receiving devices;

Fig. 19 is a top plan view of the multiplicand readout (MCRO) showing the wiring;

Fig. 20 is a detail sectional view taken substantially on line 20—20 of Fig. 19;

Figs. 21 to 23 inclusive are views similar to Figs. 18 to 20 inclusive but showing the RH (right hand) readout devices, the LH readout devices and the MC—1 readout devices;

Figs. 24 to 26 inclusive are similar views showing the IVC (inverting counter) readout devices;

Fig. 27 shows certain electro-mechanical relay contact devices which are used in the RH accumulator;

Fig. 28 shows a perspective view of similar contact devices used in the LH accumulator;

Fig. 29 shows similar contacts used in the IVC accumulator;

Fig. 30 shows multi-contact relay devices of the type used in the MC—2, MC—3, MC—4 and MC—5 counters;

Fig. 31 is an enlarged front elevational view of rate, consumption and total price hand setup devices which are used in the machine, such view shows these parts which are shown in small scale in the front elevational view Fig. 1;

Fig. 32 is a detail sectional view showing the construction of the rate setup device and the total price setup device. The section is taken on line 32—32 of Fig. 31. It will be noted that the section line is repeated, the construction of the rate and total price setup devices being identical;

Fig. 33 is a sectional detail view showing one of the consumption setup devices. The section is taken substantially on line 33—33 of Fig. 31;

Fig. 34 is an elevational view of one of the hand setup devices shown partially in elevation and partially in section to show the interior construction and the manner of driving the brushes from the hand setup notch wheels;

Figs. 35a, 35b, 35c and 35d taken together and arranged vertically in the order named, show the circuit diagram of the machine;

Figs. 36 and 36a taken together and arranged horizontally side by side show the timing diagram of the machine;

Fig. 37 is a diagrammatic view showing a typical computation which the machine is adapted to perform; and Fig. 38 is another typical computation which the machine is adapted to perform in which the consumption amount is less than the maximum of the minimum rate schedule.

In certain kinds of accounting operations of which public utility billing is typical, it is the practice to base charges on a sliding scale of rates. As an illustration in public utility billing the first 20 kilowatt hours consumed will be billed say at 9¢ a kwh. The next 30 kilowatt hours consumed will be billed at say 8¢, the next 50 kilowatt hours consumed will be billed at 7¢ and the balance of the consumption over 100 kilowatt hours will be billed at 3¢ a kwh. In computing charges with such sliding scale rate base it is the practice to effect a subtraction, make a multiplying extension for each subtraction and finally make a final multiplication for the balance amount. Then the separate extensions are added together to the final product to give the total amount to be billed.

At the present time such procedure is effected by manual and mental operations and use is made of various rate tables. The figuring of bills is accordingly laborious and time consuming and there is a considerable likelihood of errors in calculations. The present machine is adapted to handle computations of this sort.

According to the present invention, the machine is adapted to receive from a record the past meter reading and the present meter reading or equivalent information which is to be subtracted one from the other to give the amount of total consumption or total number of units to be billed. After receiving such information the machine automatically effects the subtraction of the past reading from the present reading to obtain the consumption and it thereupon proceeds to carry on the computations by the rates. When the final total billing amount is derived by the operation of the machine this amount is punched back upon the record. There is also punched back upon the record the amount of the consumption which the machine has derived by subtracting the past reading from the present reading.

The general manner of operation of the machine will best be understood from the diagrammatic view Fig. 37. The machine reads from the record card the amount of the present meter reading (5167 kwh.) and enters this amount into five MC accumulators of the machine as shown. It also reads from the record card the amount of the past meter reading (5103 kwh.) and enters this amount into the IVC accumulator. Thereupon there is a readout from the IVC accumulator through the IVCRO readout device and the true complement of the past meter reading is carried over and entered into the various MC accumulators. With a true complement, a last significant figure to the right is complemented to 10 and all other figures are complemented to 9. Thus the true complement of 5103, the amount standing on IVC, is 4897. The ultimate result is that each of these MC accumulators will have standing thereon the amount of the consumption or 64 kwh. This setup on the various MC devices is the amount of the multiplicand which is to be used in subsequent calculations.

The operator of the machine will have previously set up by hand the various rates, i. e. 9¢, 8¢, 7¢ and 3¢ on various of the rate setup or multiplier amount manifesting devices. These on the diagram Fig. 37, are indicated at MP—1, MP—2, MP—3 and MP—4. There is also a preliminary hand setup of accumulative consumption or multiplicand comparison amounts. For example, on the hand or manifesting device CRO—1 there is set up the first consumption amount of 20 kwh., on CRO—2 there is set up 20 plus 30 kwh. or 50 kwh. and on CRO—3 there is set up an accumulative consumption amount of 20 plus 30 plus 50 or 100 kwh. There is also made a preliminary hand setup of certain accumulative total prices or pre-computed product amounts, for example on the total price or product setup or manifesting device TPRO—1 there is set up the amount of 180, this being the product of 20 by 9, on TPRO—2 there is set up 420, this being an accumulative product amount resulting from the multiplication of 20 by 9 plus 30 by 8. On TPRO—3 there is manifested and set up the accumulative total price or product of 770, the same being the sum of 20 times 9, 30 times 8 and 50 times 7.

In the operation of the machine there is a concurrent readout of amounts from CRO—1, CRO—2 and CRO—3, and an entry of corresponding complemental amounts into MC—3, MC—4 and MC—5. The actual readout is effected in a complemental manner and accordingly the multiplicand comparison amounts in complementary form are entered into the multiplicand entry devices MC—3, MC—4 and MC—5 to obtain a series of remainders thereupon. Certain or all of these remainders may be real numbers and in some cases certain of the remainders will be complemental in value. The machine then proceeds to sense the various MC devices to ascertain which device contains the smallest real number. In the typical computation illustrated in Fig. 37, the smallest real number remainder (i. e. 14) stands upon the MC—4 device. As a result of such sensing operation a selecting operation is brought about, the machine selecting a certain related total price or products setup device for a reading out operation. In Fig. 37 the amount which is shown as selected to be read out is the amount of $4.20 which stands upon TPRO—2. Such product amount is then entered into the RH accumulator by the operation of the machine. At the completion of this product entry another selection is effected. The machine selects which multiplier is to be used in multiplying the smallest real number remainder amount. There is a conjoint selection of a multiplier to be used and the remainder which is to be used. The multiplier selected (with the Fig. 37 computation) is the one correlated to the MC—4 device and the selected multiplier is 7 or the multiplier which has been set up on the MP—3 device. The machine then automatically effects a multiplication of the selected multiplier by the selected remainder. In Fig. 37 such multiplication is a multiplication of 14 by 7, 14 being the remainder on MC—4 which has been selected to enter into the computation and 7 being the multiplier on MP—3 which has also been selected to enter into the computation. The product is then entered into the LH and RH accumulators or product receiving devices in the usual way, and ultimately the amount in the RH accumulator is transferred over into the LH accumulator. Such LH accumulator or products receiving device now has standing thereupon the final result of the sliding scale computation. A certain section of the LH accumulator also receives the amount of the consumption or of the true multiplicand which enters into the computation and finally this multiplicand or consumption amount with the total computed amount of $5.18 is transferred over into the record and punched thereon.

From the above explanation it will be seen that what the machine in effect does is to take the amount of 64, which is the consumption or multiplicand, and to ascertain that the amount of 64 lies between the second rate base and the third rate base. The machine then adds directly into the RH accumulator the amount of 20 times 9 increased by 30 times 8 as a single accumulative amount of $4.20 and the machine senses that 14 is the balance over 50 and multiplies this balance of 14 by 7, which is the rate base in the third rate base group.

A brief description will first be given of the various units and their location in the machine. The machine embodies a card feed and card handling section which is shown in the upper right hand corner of Figs. 1 and 3a and also shown in cross-section in Fig. 3b. This part of the machine is arranged to feed the records and derive the readings therefrom and afterwards pass the records into the punching section of the machine. The punch is of the successive column punching type and a portion of this punch is shown in the isometric view, Figs. 4 and 4a.

Figure 2:
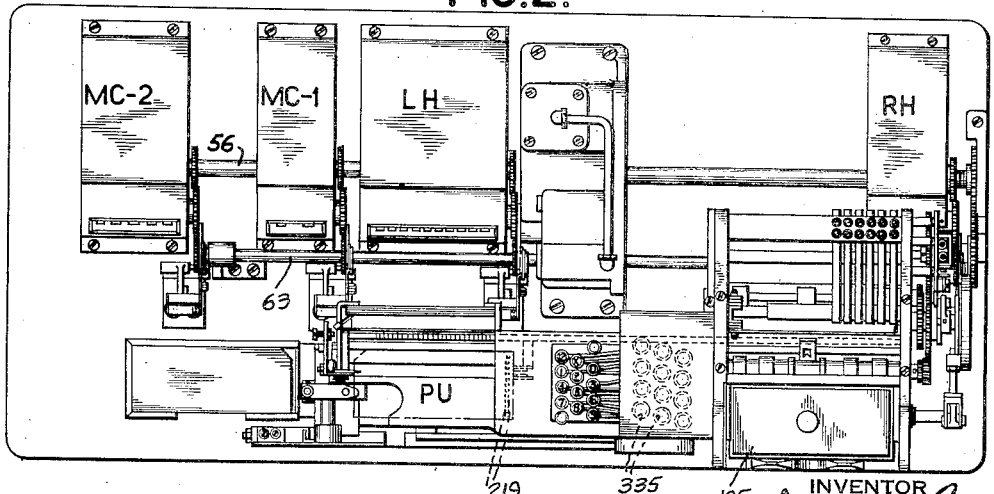
Fig. 2 is a top plan view of the machine.

The accumulators and receiving devices of the machine are as follows. In the upper part of the machine there is shown a RH accumulator generally designated RH on Figs. 2 and 3a and an LH accumulator generally designated LH on Figs. 2 and 3. Also in the upper part of the machine there are two of the MC entry receiving devices, these being MC—1 and MC—2 and shown on Figs. 1, 2 and 3. In the lower part of the machine there are the other MC receiving devices, viz. MC—3, MC—4 and MC—5 (see Figs. 1 and 3). In the lower part of the machine there is also shown an IVC accumulator designated IVC on Figs. 1 and 3a. The machine also includes a multiplying panel relay unit which is in the lower part of the machine and generally designated MPR on Figs. 1 and 3a.

In the present machine no column shift relays are required because unit computations only are handled in the rate schedules. However, in the MPR section there are other multi-contact relays which are generally of similar type and similarly operated but which have a slightly different contact blade arrangement.

The machine also includes a number of emitter and cam contact mechanisms shown on Figs. 1 and 3. The machine also includes the various hand setup devices MP—1 to 4, CRO—1 to 3 and TPRO—1 to 3, the location of which is indicated on Fig. 1.

*Machine drive*

The machine is adapted to be driven by a constantly running motor M (Fig. 3a). This motor through a belt and pulley and ratchet drive drives a horizontal shaft 51 (Fig. 3) which shaft drives an A. C.—D. C. generator 52. This generator produces the A. C. impulses and also has a direct current takeoff section. Shaft 51 through worm gear drive 53 drives a vertical shaft 54 which drives the units in the upper and lower sections of the machine. The drive to the upper units is through worm gearing 55 and drives the accumulator drive shaft 56. The various accumulators are driven from this shaft in the customary manner. The reset drive for these upper accumulators is as follows. Shaft 56 is provided with a spur gear 57 in turn driving a gear 58. Gear 58 has extending from it four Geneva pins 59 cooperating with the other or cross element 60 of the Geneva. Secured to parts 60 is an internal gear 61 which meshes with a spur gear 62 fixed on the end of the reset shaft 63. The Geneva cross element 60 also has a shaft 64 which extends to another gear 61a (Fig. 3a) similar to gear 61 having cooperating with it a spur gear 62a, driving the reset shaft 63a for the R.H accumulator unit. The drives for the units in the lower part of the machine are substantially the same as previously described and the description of these drives need not be repeated. Similar parts in the lower section of the machine will be given corresponding reference numerals with the suffix b, such parts being 55b, 56b, 57b, 58b, 59b, 60b, 61b, 62b and 63b. The lower drive shaft 56b also extends to the right (see Fig. 3a) and drives an operating cam 65 which cam through a follower 66 is adapted to actuate a cross sleeve 67 and operate certain shifting mechanism for the multiplier selector relay unit contact assemblages and for the other multi-contact relay devices which are disposed in the MPR unit.

*Card feed and card handling unit drive*

Referring to Fig. 3a, the shaft 56 at its extreme right hand end is provided with a gear 68 which through gearing 69, 70, 71 and 72 drives a gear 73 revolubly mounted on shaft 75. Gear 73 has fixed to it one element 76 of a one revolution clutch. The complemental part of which comprises a pawl 77 carried by an arm 78 which is fixed to shaft 75. This one revolution card feed clutch is engaged by the energization of a magnet 77a. With the one revolution clutch engaged, shaft 75 will rotate in unison with the gear 73 and with the clutch disengaged 73 will continue to rotate and shaft 75 will remain stationary. Gear 73 through gearing 79, 80 and 81 drives card feed rolls 82 which rotate at all times when gear 73 is rotating. In train with gear 79 is a gear 83 for driving a drag roll shaft 84 provided with drag rolls 85. Shaft 75 also has secured to it a gear 86 and a card transfer and contact cylinder 87. The one revolution clutch element 76 has two notches so that whenever the pawl 77 is engaged the element 78 of the clutch will make one complete revolution. Accordingly, with the clutch engaged the card transfer cylinder 87 will make a complete revolution. The one revolution clutch pawl 77 is engageable in either of the two notches of element 76. The one revolution clutch pawl 77 may be engaged in either of the two notches of the clutch element 76, which relation of the clutch members is provided because one counter cycle is required to traverse the card and carry it past the sensing brushes and another counter cycle is required to deliver the card to the punching section of the machine and since it is desirable that the clutch be engageable without delay upon the counter drive shaft the turning through either an odd or even number of revolutions.

*Drive to intermittently actuated contacts and feed rolls*

Gear 86 through gearing 90, 91 and 92 drives the cams for actuating the FC group of cam contacts. These cams make one revolution per card feed cycle in contradistinction to an accumulator cycle. Fixed to the shaft of gear 90 are card feed rolls of insulating material 94 which are spring pressed into contact with cylinder 87. Similar spring pressed rolls 95 are provided driven by a gear 96 in train with 86.

*Card picker drive*

Shaft 75 has secured to it a box cam 97. The cam follower 98 connects to a rock shaft 102 provided with gear sectors 103 which engage picker blocks 104 (see Fig. 3b). Upon engagement of the one revolution clutch the picker acts and withdraws a single card from the magazine 105 (Fig. 3b) and advances the card into the bite of rolls 82. Rolls 82 in turn forward the card to the card transfer roll 87. The usual curved card guide is provided around the card transfer cylinder and the advancing card is carried forward by the forward rotation of the cylinder and by the rotation of rolls 94 so as to be traversed under the main card sensing brushes generally designated 109 in Fig. 3b. Also in cooperation with the card is a pivoted card lever 111 adapted to operate card lever contacts 112.

After the card is sensed by the brushes 109 it is advanced by rolls 95 and cylinder 87 between guides 114 and 115 (Fig. 3b). While between these guides the card is advanced by the drag rolls 85 which advance the card after it has been released by rolls 95 and deliver the card into the tray of the punching section of the machine under a guide member 117. The location of the card tray is generally indicated at R (Fig. 3a). A card lever 119 is provided adjacent this point in the tray which is arranged to close card lever contacts 120 when a card is in the R position in the tray. As the card is traversed past the sensing brushes the amount of the present reading is entered into MC—1, MC—2, MC—3, MC—4 and MC—5, the same entry being made into each entry device. The amount of the past reading is also concurrently entered into the IVC accumulator. The various receiving devices which are designated MC—1 to MC—5, IVC, LH and RH are accumulators of the usual type as customarily used in tabulators with electromagnetic clutches, etc.

*Multiplying panel relays*

The multi-contact relays which are used for controlling multiplication and effecting certain control operations are of the conventional type as used in machines of this class. Each plate relay comprises a mounting plate 130 (Fig. 7) slidably supported in slotted frame plates of the machine. On each plate is a magnet designated X—1, X—2, X—3, etc. when the relay is to be used for multiplying selection purposes and S—1, S—2, S—3 and S—4 when the relay is to be used for selection of certain readout operations. Such magnets when energized release the relay parts for subsequent closure of the contacts. Sleeve 67 previously referred to has secured thereto an arm 131 which cooperates with a serrated operating bar 132, which is disposed below and to one side of the base of the controlling relay section of the machine. Arms 133 of a contact operating bail structure extend into the serrations of such bar 132 (see Figs. 8 and 13). Each arm 133 is fixed to a rock shaft 134. Secured to the opposite ends of shaft 134 are upstanding arms 135 and 136. Arm 135 is also fixed to arm 133 and connecting the arms 135 and 136 is a cross member carrying a bail of insulating material 138. Arm 136 extends upwardly beyond 138, the extension being designated 136a. The relay magnets X or S have a pivotally mounted armature 139 spring retracted by spring 140. The armature 139 also has an upstanding portion 141 (see Fig. 8) which portion is in alignment with the screw 142 carried by the bent over portion 143 of arm 136a.

Referring to Fig. 8 with the serrated operating bar 132 in the position shown, the arm 133 will be rocked in a clockwise direction swinging 136a clockwise and causing 142 to abut against 141 and restore and knock off any previously attracted armature. Each armature 139 is provided with a latch portion 144, and pivotally supported on 136a upon a stud 145 is a forked member 146. Such member (see Fig. 7) is disposed to the left of 136a and the forks are turned over and pass the sides of 136a. One portion 147 cooperates with the latch point 144 on armature 139. The other fork 148 is on the opposite side of 136a (see Fig. 8). A spring 149 is fastened at one end to 148 and at the other end to 136a and tends to rock the forked member 146 anti-clockwise with respect to 136a. After the armature has been restored as indicated in Fig. 8, the serrated operating bar 132 by its cam action is shifted slightly to the right. Such action allows arms 133 to follow the operating bar by the spring pressure of contact blades 150. This slight movement of 133 to the right swings 136a slightly to the left to a position in which there is still clearance between 147 and 136a (see Fig. 9). With the parts in this position the spring strain of contacts 150 is removed from the latch point 144. The latch may now be released by the energization of the magnet. Thereupon the action of spring 149 causes 147 to snap over the top of the latch point 144 to the position shown in Fig. 10. The next action is the actual closing of contacts 150 with 151 (see Fig. 11). Such action occurs upon the further shifting of the operating bar 132. 133 swings to its extreme anti-clockwise position under the action of spring contacts 150. The insulating bail then moves to the left and allows the contacts 150 and 151 to close.

The further operation comprises the knocking off of the armature as shown in Fig. 8 and previously described. This armature knocking off action positively opens up the contacts 150 and 151.

Fig. 12 shows the relation of the parts upon an operation when no armature has been tripped. In this event the latching nose 144 cooperates with the forked arm 147 and prevents arm 136a from swinging to the left beyond the latching point.

Referring now to Figs. 14 and 15, there are in addition to the multiplying relays three control or selector relays adapted to be controlled by the selective energization of magnets S—1, S—2 or S—3. The contacts controlled by these relays are two-blade contacts which are four in number, and such contacts are designated 152 and 153. 152 it will be understood corresponds to 150 and 153 to 151. There is also a supplemental control relay designated S—4 which is provided with thirteen sets of three-blade contacts. The three-blade contacts are designated 154, 155 and 156 (see Fig. 17). It will be understood that upon the swinging of the bail 138 of this relay that contacts 154 and 155 will open and 154 and 156 will close. If, however, the bail is not allowed to shift 154 and 155 will remain closed and 154 and 156 will remain open. Such three-blade contacts 154, 155 and 156 are controlled by the energization of another control magnet S—4.

*Emitters and CC cams*

The machine includes a number of emitters of conventional construction, an impulse distributor and a number of CC cam contact devices. The emitters are shown in Fig. 3 and are respectively designated 157 to 166 inclusive. The impulse distributor is designated 167 and the cams for operating the CC group of cam contact devices are designated CC—1 through 10.

*Electro-mechanical relays in the RH and LH, IVC and MC—2 through 5 accumulators*

Fig. 27 shows the contact devices in the RH accumulator. This electro-mechanical relay comprises five three-blade contacts designated RH 1 to 5 inclusive. There are also normally closed two-blade contacts RHF and RHC and normally open two-blade contacts RHA, RHB and RHE.

The above various RH contacts are arranged to shift to reverse position by energization of magnet 168RH which when energized, trips armature 170, releasing 171 and allowing bail shaft 172 to rock under the influence of spring 173. The bail 174 upon moving allows the contacts to shift. Restoration of the RH contacts and re-latching of 171 and 170 is effected by a lever 175 fixed to the bail shaft which lever cooperates with the lever 176 having its opposite end cooperating with the cam 177 upon a reset gear 178 of the RH accumulator. The LH accumulator is provided with contacts which are similarly operated. The normally closed contacts are LHF and LHE and the normally open contacts are LHB, LHC and LHD. Such contacts are released by the energization of a magnet 168LH similar to 168RH. The restoring parts are of the same construction as for the RH contacts and are operated from a cam fixed to the LH accumulator reset gear. A similar arrangement of contacts are provided in the IVC accumulator which are allowed to shift upon the energization of magnet 168IVC. Such contacts comprise a set of four normally closed two-blade contacts which as a group will be designated IVD and another set of four normally open two-blade contacts which as a group will be generally designated IVE. In each of the MC—2, MC—3, MC—4 and MC—5 entry receiving devices there are a group of ten normally open two-blade contacts. These will be designated to correspond to the related entry receiving devices. As shown the contacts are designated MC—2—1 to MC—2—10, signifying that the contacts are related to the MC—2 accumulator. The release magnet is designated 168MC—2. It will be understood that there are similar contacts and similar release magnets with the associated MC—3, MC—4 and MC—5 accumulators.

*Punching mechanism*

The punching mechanism (see Figs. 4 and 4a) includes two card feed racks 181 and 182. 182 carries an arm provided with pusher fingers 183. The drive is by a separate motor M—2, which through the driving train shown, drives shaft 184 which has a ratchet shaped clutch element 185 fixed on one end of it. Alongside of 185 is a gear 186 which meshes with the lower teeth of 181. Secured to 186 is a disk 187. Pivoted on 187 is a member 188 provided with a ratchet shaped clutch tooth 189. Alongside of 188 is another member 188b which lacks the clutch tooth. On 188 is a pin 188c overlying an arcuate surface of 188b. The free end of 188b is connected to a toggle member 190 by a link 191. 190 is pivoted on 187 at 192. The opposite end of 190, remote from its pivot 192 is connected to a spring element 193 which spring tends to hold the clutch tooth 189 out of engagement with the clutch teeth of element 185 and allows it to engage when 190 is shifted. For the purpose of effecting a clutching action a punch feed clutch magnet 194 is provided. This magnet when energized attracts its armature and causes an arm 195 to engage a pin 196 (see Fig. 4a, in which figure the extension of this arm 195 is shown broken off for clarity of illustration of the other parts), depressing 188b and allowing 188 to descend so that the tooth 189 engages with the ratchet 185. Upon such engagement the gear 186 will be driven in counterclockwise direction substantially a single revolution, shifting rack 181 to the left. This action will, through the card pusher shown in Fig. 4a, move the card from the R position to the R—1 position. Also when magnet 194 is energized, an arm 195a (see Fig. 6) on the armature, will close contacts 197. Such contacts are latched closed by a latch 198. The latch 198 is tripped to allow the contacts to reopen by a knockoff 199 carried on the back of gear 186 (see Fig. 4a). At the termination of the counterclockwise movement of gear 186 the tails 200 of parts 188 and 188b will strike a projection 201 on a fixed plate to effect the disengagement of the tooth 189 from the ratchet 185. It will be understood that the tails 200 do not actually pass the fixed projection 201 but are merely intercepted by such projection and later retreat away from the projection in a clockwise direction under the power of the spring in barrel 202. This action also restores the toggle parts to normal position.

The above driving action has wound up a spring in barrel 202. Upon disengagement of the one revolution clutch 189, rack 181 returns to the right under the influence of the spring in barrel 202.

The driving train to the second card carriage rack 182 is as follows. Rack 181 has its upper teeth intermeshed with gear 203, which has secured to it a member 204 (see also Fig. 5) having a single notch or tooth disposed in the plane of a pawl 205 which is pivoted on part 206 fixed to the shaft 207. 207 on its opposite end carries a gear 208 which meshes with card carriage rack 182. Suitable mechanism shown in Fig. 5 controls the co-action of pawl 205 with member 204 so that with the rack 181 in extreme right hand position pawl 205 will be disengaged from the clutch element 204. Such disengagement is effected by the rocking of 209 in a clockwise direction by the co-action of the pin 210 with a block 211 carried on rack 181. Upon initial movement of 131 to the left the block 211 will clear the pivoted camming element 209 allowing a slight counterclockwise motion of it so that 205 under spring action may rock and engage the tooth of member 204. Thereafter drive will come from 181 through gear 203, through 204, to pawl 205, to 206, to shaft 207 so that a clockwise rotational movement will be imparted to 207. This action will, through gear 208, traverse rack 182 to the right. The card carriage rack 182 will thus be shifted to extreme right hand position permitting the card pushers 183 (Fig. 4) to first ride over the surface of the card and ultimately engage back of the trailing edge of the card at the R—1 position. Rack 182 has associated with it a spring drive comprising the usual spring barrel 212. This spring is wound up by the traverse of 182 to the right and is adapted to cause a movement of 182 to the left under spring action. The rack 182 also has associated with it an escapement mechanism 213 having a dog 214. This escapement is more fully described in Schaaff United State Patent No. 1,426,223 and in Lee and Phillips Patent No. 1,772,186. The usual controlling contacts 215 customarily in machines of this class are also provided cooperating with the escapement parts.

Removably secured to the card carriage rack 182 is a skip bar 216 provided with a notched portion 217 which permits skip lifter lever 218 to descend when in the notch or to remain elevated when riding on the high part of the skip bar. When the skip lifter lever descends into the notch it allows the dog 214 of the escapement mechanism to cooperate with the ratchet teeth of rack 182. With skip lifter lever 218 riding on the top of the skip bar 216 the escapement will be disabled so that the card carriage rack 182 can traverse without stopping at each card column until the notch 217 is reached. Thereafter there is an intermittent motion of the card carriage to the left under spring action and under escapement control. When the skip lifter lever again rides out of the notch the card carriage rack 182 takes its full excursion to the left. The location of the beginning of the notch in the skip lifter lever bar determines the position for the beginning of product punching. When the escapement dog is lifted up the contacts 215 are open as is customary in machines of this class. The purpose of contacts 215 is to break the circuit to any punch selector magnet which has become energized and to prevent arcing at the readout strip. Contacts 215 remain open during escapement of the card carriage rack and reclose when the rack has fully escaped to the next column position. They also serve to prevent undesired successive energizations of a punch selector magnet. Their operation will be more fully described hereinafter in connection with the description of the circuit diagram. It may be explained that various forms of skip bars can be placed in the machine depending upon the class of work which is to be performed. The punching mechanism proper need not be fully described as it is set forth in the Lee and Phillips patent above referred to and in British Patent No. 362,529. In brief it comprises a set of punches 219, which punches are adapted to be depressed to perforate the card through interposers not shown, but which are under the control of punching selector magnets.

Referring to Fig. 4 there is shown disposed alongside of the card carriage rack 182 and fixed to the frame of the machine a block or strip of insulating material 220. Disposed in this block are a number of spots 221 of conducting material and alongside of these spots is a common strip of conducting material 222. A suitable bridging piece or multiple brush assembly 223 is carried by the card carriage rack 182 and as this card carriage rack moves the bridging brush 223 is displaced and establishes circuit connections from the common bar 222 to one of the spots 221 depending upon the columnar position of the card carriage rack 182. Spots 221 are preferably placed in two rows and inter-staggered as shown. This structure will be hereinafter termed "a reading strip".

Card ejector

Referring to Fig. 4, after the card has reached the R—1 position and has been traversed past the punches and has been punched, or has been traversed past the punches without punching, it ultimately reaches a position at the extreme left hand end of the punching section of the machine from which point it must be discharged into the discharge hopper. The card eject mechanism is shown in Fig. 4 with the parts shown in the position which they assumed before the machine was started into operation. Upon the first card feeding operation through the punching section of the machine, rack 181 will have moved towards its extreme left position. After reaching the dotted line position shown in Fig. 1, 181 moves further to the left and thrusts a rack 224 to the left compressing coil spring 225. Bearing against a shoulder on rack 224 is a contact operating part 226. When 224 is thrust to the left, contacts P—5 which were previously closed will open under their own spring action. The displacement of rack 224 to the extreme left position will, through intermediate gears 227, rock a shaft 228 in a clockwise direction to bring an ejector clip assemblage 229 away from the position shown in Fig. 4 to a position in which the ejector clip can receive a card which has been advanced through the machine. With the ejector clip assemblage 229 disposed in such card receiving position the assemblage will be latched in such position by a latch 231, which latch is fully described in British Patent No. 362,529 (see latch 216 of that patent in Fig. 16). The ejector clip latch is adapted to be released by an ejector clip magnet 232. Upon energization of the eject magnet 232 latch 231 is released so that the ejector clip assemblage which has then grasped a card, swings from the card receiving position to the position shown in Fig. 4, in which position the jaws of the ejector open up so that a card can be discharged therefrom.

Contact devices in the punching section of the punch

The contact devices P—5 have been previously described. In the punch there are also contacts P—1, P—2, P—3 and P—4. Such contacts are operated as follows. Contacts P—1 are closed when rack 181 is in the position shown in Fig. 4a, that is in its extreme right hand position and such contacts automatically open upon the movement of 181 from the position shown and remain open during the complete traverse of the rack 181 to the left and back to its starting position. An extension 233 on rack 182 is adapted, when rack 182 has passed beyond the last column position, to cause contacts P—2, P—3 and P—4 which were previously open, to close. Such contacts P—2, P—3 and P—4 are normally open when rack 182 is in any of the positions to the right of the position beyond the last column position.

MC—2RO to MC—5RO readouts

Referring to Figs. 18 to 20, inclusive, 256 is the clutch gear pertaining to the units order of the MC—2 to MC—5 readout devices. In these MC readout devices the units clutch gear 256 drives a units brush 257U which cooperates with a set of segments 258 and which receives current from a common conducting segment 259. Similarly, units driving train 256 drives a brush 260U receiving current from a common segment 261 and cooperating with segments 262. Also cooperating with segment 262 is another brush 260T receiving current from 261 and driven by the tens order train 264. This train 264 also drives a brush assemblage 257T which cooperates with the segments 265 and receives current from the segment 266. This arrangement is repeated for relatively higher orders of these readout devices.

Referring now to Fig. 19, this figure shows the cross-wiring for the MC readout. The 1 to 9 spots of segment 258 are shown connected to the 1 to 9 spots of the 265 set and the 1 to 9 spots of the 262 set are connected to the 1 to 9 spots of the 270 segments, skipping over the intermediate segments to the left. These bus connections are respectively indicated by the wires generally designated 271 and 272.

On the MC readout devices zero spots are provided but on each readout only a single zero spot is actually wired. Referring to the circuit diagram (Fig. 35c) it will be seen that on the MC—2 readout there is a wired zero spot 273 and the cooperating common supply segment 274 for this zero spot is electrically separate from the common segment for the balance of the segment spots. This arrangement is followed for the MC—2, MC—3, MC—4 and MC—5 readout devices, that is there is only a single zero spot wired in each readout, the same being the spot pertaining to the highest order column of the readout and such zero spot in each instance has a separate current supply segment portion.

RH, LH and MC—1 readouts

Referring now to Figs. 21 to 23 inclusive, Fig. 23 shows the general arrangement of drive for these readouts. In these readouts, segment spots 275 are common to two sets of brushes designated 276 and 277 respectively, which brushes respectively cooperate with conducting segments 278 and 279. Brush 276 is driven from the units order clutch gear 280. Brush 277 is driven from the tens order clutch gear 281. A similar arrangement of brushes and readout spots is provided for the relatively higher orders. On the RH readout there are nine sets of spots 275 and these spots are transversely connected by the buses generally designated 282 on Fig. 22. On the LH readout there are ten sets of spots 275 as shown on the circuit diagram (Fig. 35d) and such ten sets of spots are connected by ten sets of transverse buses 282a.

The MC—1RO readout is driven in the same manner and is substantially the same as the RH readout, that is it has nine sets of spots 275 and such spots are connected by transverse buses which will be designated 282b on the circuit diagram (Fig. 35d).

Inverter readout

Referring now to Figs. 24 to 26 inclusive, 283 generally designates the units order clutch train. This train drives a brush 284U cooperated with a common segment 285 and with the segment spots 286. 287 is the tens order clutch train which drives a brush 284T cooperating with a common segment 285T and with a set of segment spots 286T. On the hundreds order driving train 288 the brush 284H cooperates with segment spots 286H and with a supply segment 285H. The segment spots 286H, 286T are wired together by transverse buses 289 and the segment spots 286T are wired to the units segment spots 286 by the diagonal wiring generally designated 290. The arrangement of this wiring is such that the 9 spot of the 286 segment is wired over to the 8th spot of the 286T segment, the 8th spot of the 286 segment is wired over to the 7th spot of the 286T segment and so on.

*Hand setup devices for multiplier rate amounts, accumulative consumption amounts and accumulative total price amounts*

The hand setup devices for the various multiplier rate amounts, the accumulative consumption amounts and the total price amounts are substantially the same in construction as the conventional readout devices heretofore described. They differ in that in positioning the brush element from a clutch train of the mechanism there is provided a knurled wheel associated with each brush assembly which knurled wheel can be positioned and turned by hand.

Referring to Fig. 32 which shows a typical hand setup device adapted for use either for a multiplication setup, i. e. rate or for a total price setup, the knurled wheel is shown at 291. The periphery of this wheel may be provided with suitable designating indicia. The wheel may be impositively held in a desired set position by a spring detent 292. In this readout nine conducting segment spots generally designated 293 are provided and there is a single common conducting segment 294. The brush assemblage 295 is positively fixed to the knurled hand set wheel 291. On the accumulative consumption hand setup device the construction is substantially the same except that in lieu of providing nine spots 293 as in the other device, ten of such spots designated 293a are provided.

The relation of the brush assemblage is also such that with one brush standing on zero the other brush will be on the common segment strip whereas the type of device shown on Fig. 32 there is no zero spot and accordingly current supply is entirely cut off with the brush assemblage in the neutral position shown. These devices function in a similar manner to a readout mechanism and no further detailed description is required.

It may be explained that for selecting rates there are four of the assemblages of the type shown in Fig. 32, these being designated MP—1, MP—2, MP—3, MP—4 on Fig. 31.

It will be understood that with a rate schedule such as 9, 8, 7 and 3 cents that the rate of 9 would be set up on the MP—1 readout, the rate of 8 would be set up on the MP—2 readout, the rate of 7 on MP—3 device and the rate of 3 on the MP—4 device.

The accumulative consumption setup devices, it will be noted are in groups of four wheels or setup units. The maximum amount of accumulative total price with the present machine and, according to the typical rate schedules herein involved, involves four columns. Each setup device accordingly includes four orders of devices which are identical to the construction shown in Fig. 32. One group of four devices being generally designated as a group TPRO—1. The second group being designated as a group TPRO—2 and the third group being designated TPRO—3. If the problem of the general type shown in Fig. 37 were to be handled, the amount of 180 would be set up on TPRO—1. The amount of 420 would be set up on TPRO—2 and the amount of 770 would be set up on TPRO—3.

In the above computation, it will be noted that the highest order wheel is not used, but is left on zero because the accumulative comparison total does not reach the amount of 1000. The hand setup devices for setting up accumulative consumptions are also arranged in groups of four, there being three groups, one being designated CRO—1, the second being designated CRO—2 and the third being designated CRO—3.

When a rate computation of the type shown on Fig. 37 is to be carried out the amount of 20 would be set up on CRO—1, the amount of 50 on CRO—2 and the amount of 100 on CRO—3.

It may be explained that with the form shown in Fig. 32 and used for MP—1 to MP—4 inclusive and TPRO—1 to TPRO—3, that the spots are wired up for direct reading, while with the construction shown in Fig. 33 and used for reading out accumulative consumption that the spots are wired up for a complemental readout. In other words, the CPRO—1 to CPRO—3 devices are wired up in a generally similar manner to an inverting counter readout and are cooperatively associated with a complemental emitter.

*Circuit diagram*

It will be assumed that a typical computation of the type shown in Fig. 37 is to be performed and that the operator of the machine will have set up the proper rates on the MP—1 to MP—4 devices and will have set up the corresponding accumulative consumption amounts on the CRO—1 to CRO—3 devices and will also have manually set up the accumulative total prices on the TPRO—1 to TPRO—3 devices. Cards prepunched with the amount of the past consumption and the amount of the present consumption or other data which is to be subtracted one from another to obtain a net amount are placed in the supply magazine of the machine.

Referring to the circuit diagram (Fig. 35d) the first operation is to close the main motor switch 300 which supplies current to the driving motor M, sets it in operation and causes alternating current impulses to be impressed upon the AC bus 301. Direct current is also supplied to the DC buses 302 and 303.

Upon starting up the machine the relation of the punch parts will be such that rack 181 (Fig. 4a) will be in extreme right hand position so that contacts P—1 are closed and the rack 182 will be in a position beyond the last column position, so that the last column contacts P—2, P—3 and P—4 in the punch are closed. With current supplied to the DC buses 302 and 303 the eject magnet 232 (Fig. 35d) will become energized when cam contacts CC—1 close through the circuit which extends through last column contacts P—2. The energization of the eject magnet 232 will cause eject contacts P—5 to close.

With cards in the supply magazine the operator now depresses the start key 304 (Fig. 35d). Depression of the start key establishes a circuit from the 303 side of the DC line through relay coil C, through the start key contacts, through cam contacts FC—1 now closed to the other side of the DC line. The energization of C attracts relay points C—1 and establishes a stick circuit for C through stop key contacts 305. The energization of relay coil C also causes the closure of relay points C—2 and establishes a circuit from the 303 side of the DC line through relay points F—2 now closed through feed clutch magnet 71a, through cam contacts FC—2, now closed, through relay points C—2, through contacts LHF now closed, relay points R—2 now closed, contacts RHF now closed, contacts P—1 now closed to the other side of the DC line 302.

It may be explained that contacts P—1 (Figs. 4a and 35d) are only closed when the feed rack 181 (Fig. 4a) of the punch is in the extreme right hand position. This contact interlocking action is provided to prevent starting up of the card feed in the card handling section of the machine when the rack in the punch section is not returned to proper position. Relay coil F is energized when a card is in the card tray of the punching machine, such coil being energized by the closure of the card lever contacts 120. The energization of F opens points F—2 and prevents the starting of the feeding action if a card is disposed at the R position in the punching section of the machine at this time.

It will be understood that in starting up the machine that the start key must be kept down for a time. It has been explained before that the feed of the machine is arranged to permit the use of constantly running feed rolls in the machine for all feed rolls except those which are associated with the contact and card transfer roll 87. The arrangement of the feed is such that when cards are first placed in the magazine, it is necessary to press down the start key after which the machine will run through two card feed cycles or four machine cycles to feed the first card. After the machine has been started and when it is in operation upon a run of a multiplicity of cards, only two machine cycles are required for card feed in the main card handling section of the machine. The first complete card feed cycle upon starting up the machine will advance the first card over the top of the transfer roll and at the end of the first cycle the nine index point position will be about ready to pass under brushes 109. At the beginning of the second card feed cycle the card traverses the reading brushes 109 and the amount of the present reading and past reading will be entered into the various MC receiving devices and into the IVC accumulator. The entry circuits will now be traced.

Figure 35A:
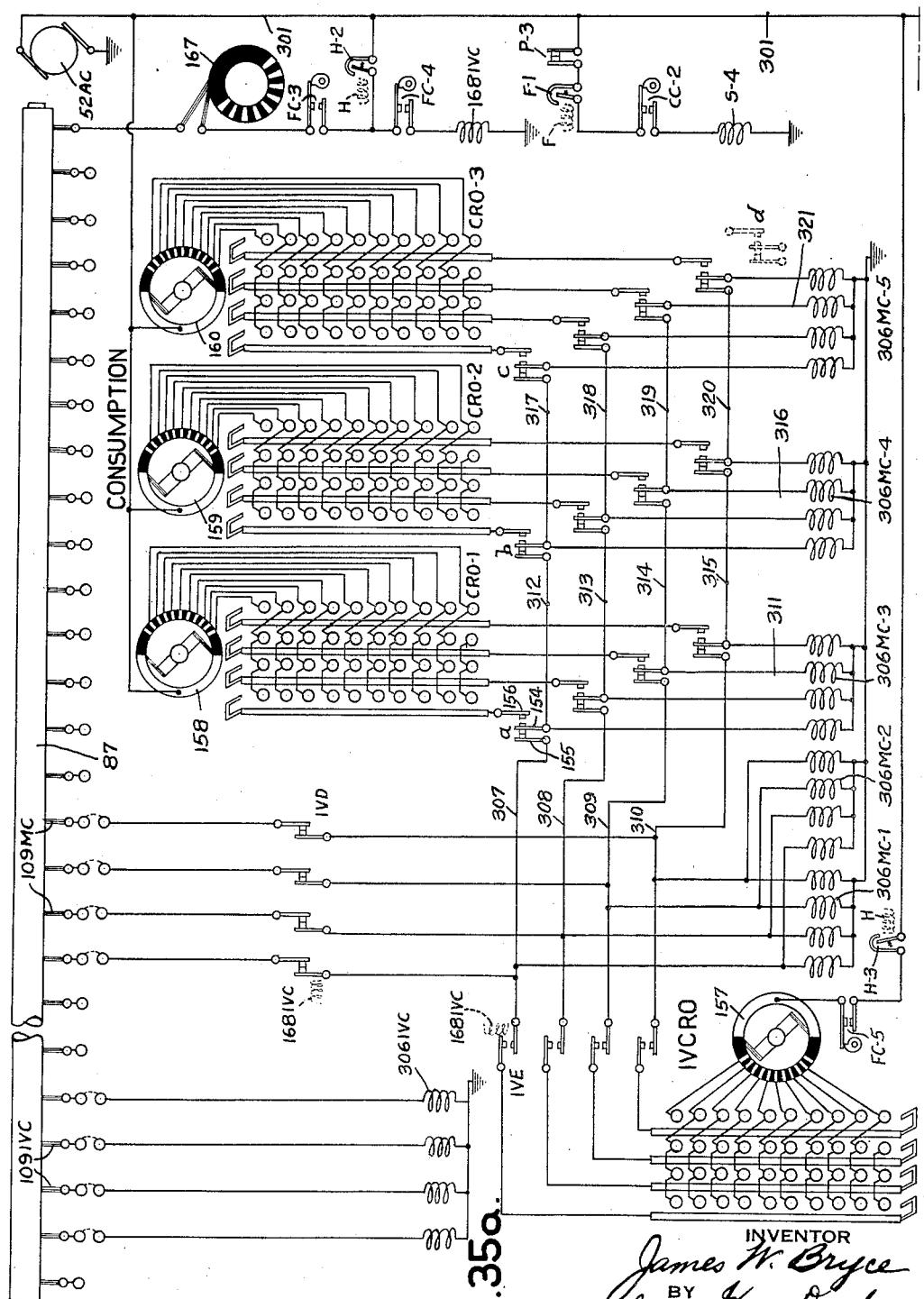

In the passing of the card through the card handling section of the machine, card lever contacts 112 close, energizing relay coil H (Fig. 35d). The energization of coil H causes the closure of points H—1 and establishes a stick circuit for coil H through cam contacts FC—1. Coils C and H remain energized during the desired cycles of machine operation since contacts 112 are closed at the time cam contacts FC—1 open and likewise FC—1 are closed when the card lever contacts 112 are open. Energization of H closes points H—2, (Fig. 35a) and current accordingly flows from the 301 side of the AC line through H—2 now closed, cam contacts FC—3 now closed, through the impulse distributor 167 and at the proper index point in the cycle of the machine to card transfer and conductor roll 87, through the cards and through the brushes 109 pertaining to the present reading entry designated 109MC, and through the brushes pertaining to the past reading designated 109IVC.

The customary plug board is provided and plug connections extend from the 109IVC brush circuits to the IVC entry device. The magnets of this device are respectively designated 306IVC. The plug connections which are associated with the 109MC brushes extend through relay contacts IVD now closed, to a set of horizontal lines 307, 308, 309 and 310. These lines are respectively permanently connected to the MC—1 accumulator magnets and the MC—2 accumulator magnets which are correspondingly designated 306MC—1 and 306MC—2. The lines 307 to 310 inclusive also extend over to the blades 155 of a group of four of the three-blade contacts of the type shown on Fig. 17. The contacts are correspondingly labeled in their association with line 307 and it will be understood that the group as a whole will be designated a. As shown the center blades of this a group of contacts extend down by wires generally designated 311 to the 306MC—3 accumulator magnets. Other lines 312, 313, 314 and 315 connect the center blades of the a group with the 155 blades of the b group and from the center blades of the b group a set of lines 316 extend down to the 306MC—4 accumulator magnets. A set of lines 317, 318, 319 and 320 extend over to the 155 contacts of the c group and the center contacts 154 of this c group are wired to all lines generally designated 321 to the 306MC—5 group of accumulator magnets. Upon the entry cycle from the card, concurrent entries are made into the MC—1, MC—2, MC—3, MC—4 and MC—5 counters, the contacts being in the relation shown in Fig. 35a.

The next operation to be described is the entry of the complemental amount standing on the IVC accumulator into all of the MC—1 to MC—5 entry devices in order that these various entry devices will have standing thereon the amount of the consumption, viz. their reading less the reading standing upon the IVC accumulator. This is brought about by effecting a readout from the IVCRO of the complemental of the amount standing upon this accumulator and entering such complemental amount concurrently into all of the MC entry receiving devices. The manner in which this is brought about will now be traced. With relay points H—2 closed, current will flow from the 301 side of the AC line through cam contacts FC—4 at the proper time in the cycle, through relay magnet 168IVC and back to ground. Energization of 168IVC opens contacts IVD and closes contacts IVE. Energization of coil H also causes closure of relay points H—3 and at the proper time in the cycle, cam contacts FC—5 close supplying current to the complemental emitter 157. The emitter emits complemental impulses through the IVCRO readout, thence through the IVE contacts now closed and to the 307, 308, 309 and 310 wires. From these wires the impulses flow through the paths previously traced to the 306MC—1 to 306MC—5 accumulator magnets and causes the complemental amounts to be entered into all of the accumulators, bringing about a desired subtracting operation by complemental addition. At this time in the operation of the machine, the card will have reached the R position in the tray of the punch and will have closed contacts 120, causing relay coil F to be energized. The energization of F opens points F—2 and prevents subsequent unwanted card feed cycles.

The next step in the procedure of the operation of the machine is to read out the amounts standing on the CRO—1, CRO—2, CRO—3 readout setup devices and enter the complements of such amounts respectively into MC—3, the MC—4 and the MC—5 counters.

Also upon energization of relay coil F, relay points F—1 (Fig. 35a) are closed. A current path is established from the 301 side of the AC line through contacts P—3 now closed, through relay points F—1, through cam contacts CC—2 which close at the proper time in the cycle, through electro-mechanical relay magnet S—4 and back to ground. The relay coil S—4 it will be remembered is the coil which when energized shifts the 155, 154 and 156 contacts of the a, b and c groups to reverse position from that shown. With such contacts shifted individual circuits are established from the CRO—1, CRO—2 and the CRO—3 readout devices respectively and individually to the 306MC—3, 306MC—4, and the 306MC—5 counter magnets. Upon such shift of the three-blade contacts of the a, b and c groups and with complemental emitters 158, 159 and 160 in action, complemental impulses are emitted through the accumulative consumption readout devices CRO—1 to 3 to the corresponding MC—3 to MC—5 accumulators. These impulses enter complementary values of accumulative consumption and bring about subtraction by complemental addition. With such withdrawing operation completed, the accumulators will now attain the status shown on Fig. 37, that is, 44 will stand on MC—3, 14 on MC—4 and 9964 on MC—5.

Provision is made for preventing the repeated introduction of complements of accumulative consumption amounts into the entry devices. Such cutting off after one entry is effected by the opening of contacts F—1 and P—3. Before explaining the manner in which contacts F—1 are opened, it may be explained that the energization of relay coil F in the manner previously explained has closed contacts F—3 (Fig. 35d) and opened contacts F—2. Closure of contacts F—3 establish a circuit through cam contacts CC—3 which close at the proper time in the cycle through punch feed clutch magnet 194, through contacts P—5, through contacts P—2 and back to the other side of the DC line. Energization of 194 closes contacts 197, such contacts being held closed by latch 198 and brings the driving motor M—2 for the punching unit into operation. The card in the punching unit which was previously at the R station or position is then fed in the punch and contacts 120 are open causing the de-energization of coil F. De-energization of F causes relay points F—1 to open preventing a re-energization of S—4. Such card feeding operation in the punch also opens contacts P—3.

It may be explained that the three-blade contacts controlled by S—4, while tripped electrically, are mechanically restored to normal position and this restoring cuts off current flow from the CRO—1 to CRO—3 readout devices. After being reopened, the three-blade contacts are not allowed to re-close because by this time coil S—4 cannot become re-energized since contacts F—1 and P—3 will have been opened.

Referring first to Fig. 37, it will be noted that at this stage of the operation in the machine that the amount of 0064 kwh., i. e. the total consumption stands on MC—1 and MC—2, that the amount of 0044 stands on MC—3, the amount of 0014 stands on MC—4 and that MC—5 has a reading of 9964. The machine now proceeds to sense the readings standing upon the MC—3, MC—4 and MC—5 entry receiving devices to ascertain on which entry receiving device there is a reading of 9 in the highest order and having effected such sensing it calls into action an accumulative total price setup device which is related with relatively the next lower one of the MC devices.

What the machine in effect does is to sense the fact that the highest order brush standing on the MC—5RO readout is not standing on zero but is standing on 9, but to also sense the fact that there is a brush in the highest order of the MC—4RO which is standing on a zero spot. Having sensed this condition the machine controls the operation accordingly. The sensing circuit for effecting testing will now be traced.

Figure 35B:
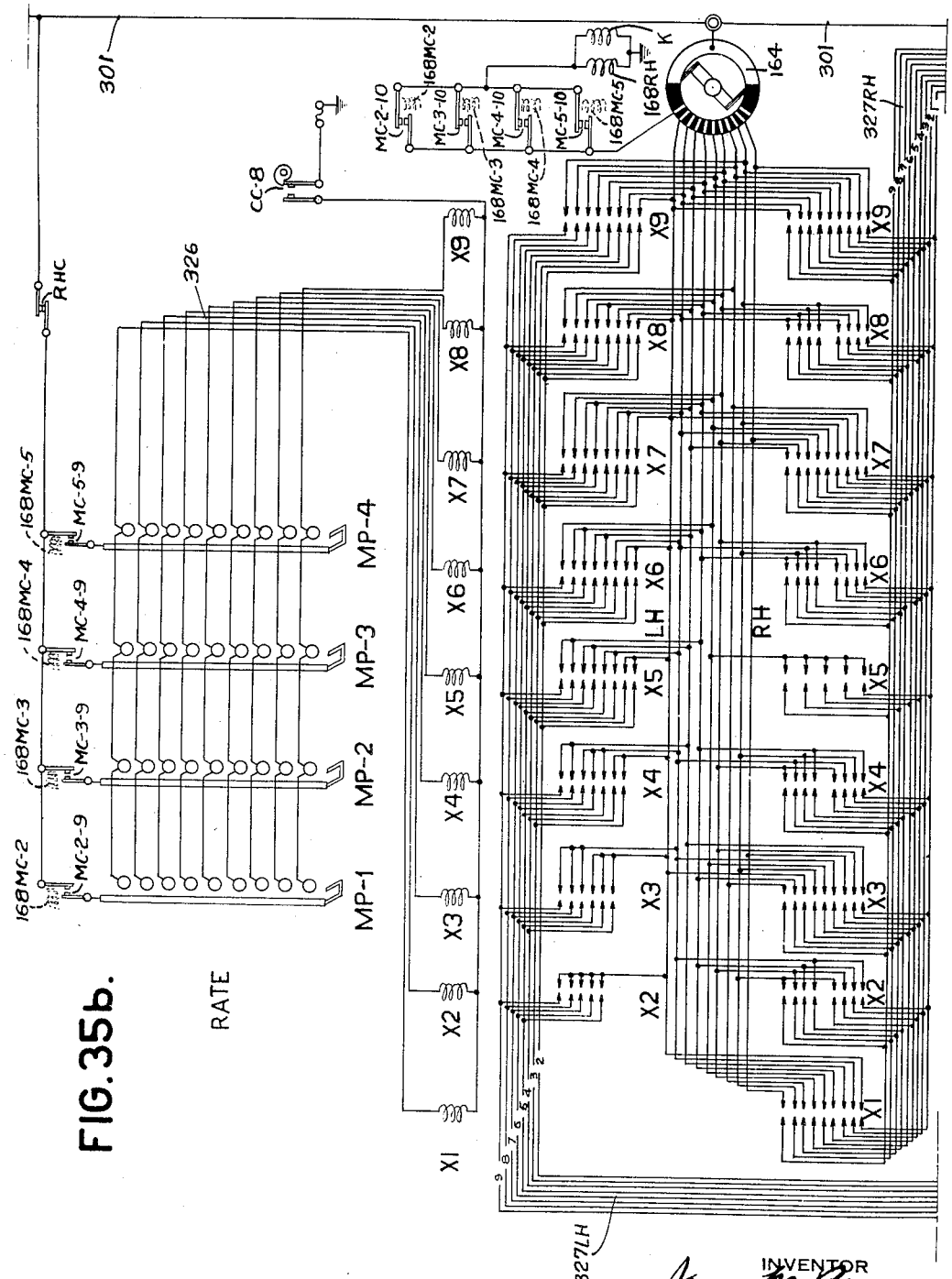
Figure 35C:
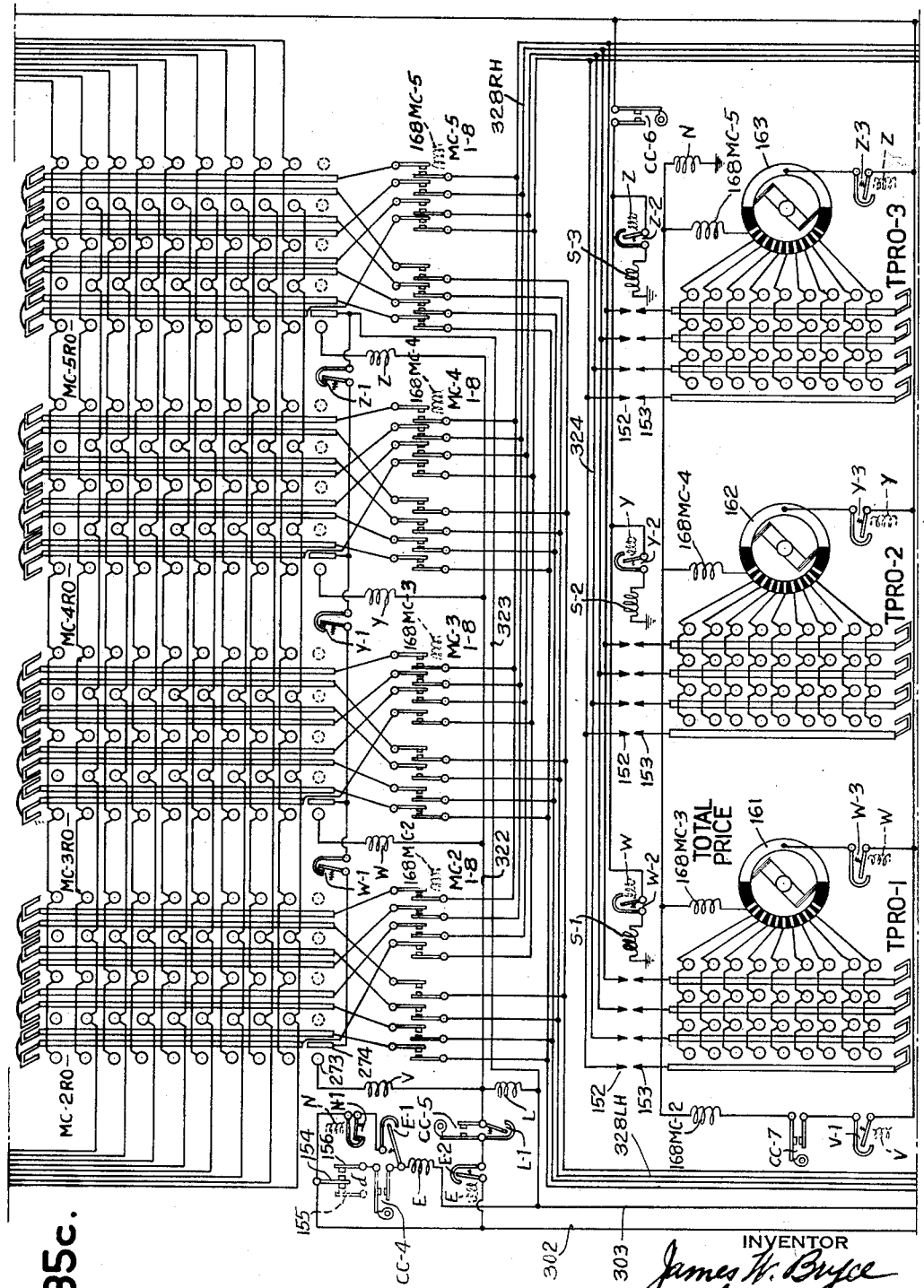

Referring to Figs. 35a and 35c it has been explained before that the 155, 154 and 156 three-blade contacts are in three groups of four contacts each, the groups being designated a, b and c. There is an extra group of these three-blade contacts designated d and shown on Fig. 35a. Such d group is shifted upon energization of S—4.

Referring now to Fig. 35c, upon shift of this d group of three-blade contacts a current path is established through the center contact 154 of the d group to the 156 contact of this group, thence through cam contacts CC—4 which close at the proper time in the cycle through a relay coil E and back to the other side of the D. C. line 303. Energization of relay coil E closes relay points E—1 and establishes a stick circuit for relay coil E, through relay points N—1 now closed and back to the other side of the D. C. line 302. The energization of E also closes relay points E—2 and current flows from the 302 side of the D. C. line through relay points E—2 through cam contacts CC—5 which close at the proper time in the cycle and back to the 303 side of the D. C. line, through relay coil L. The energization of relay coil L causes closure of relay points L—1 and establishes a stick circuit for relay coil L around contacts CC—5. When coil L is energized D. C. current supply is available on wire 322. Connecting with wire 322 are relay coils V, W, Y and Z. The other ends of these coils connect to the zero spots 273 of the MC—2 and MC—5 readouts such zero spots pertaining only to the highest order in each readout. The supplemental common segment portions 274 of these readout devices are wired in series through relay points W—1, Y—1 and Z—1. It accordingly follows that if there is a 9 standing on the highest order of the MCRO—5 readout that relay coil Z will not be energized and relay points Z—1 will remain closed. On the next readout, viz. the MC—4RO the brush will be standing on the zero spot and accordingly the coil Y will be energized, which upon energization will open up points Y—1. It is immaterial that relay coils W and V may be momentarily energized because Y will be maintained energized and by being maintained energized will open up points Y—1 and open up the return circuit to the D. C. wire 323.

Referring now to Fig. 38 wherein a different typical computation is shown, it will be noted that in this figure the amount of 9999 stands on MC—3 and the amount of 019 stands on MC—2. Under these conditions of operation relay coil W would not be energized, nor would relay coils Y or Z because their related brushes do not stand on a zero spot but stand on 9. Relay coil V on the other hand would be energized, since its related brush stands on a zero spot.

The above selective energization of the various coils V, W, Y or Z is used for selecting a total price setup device from which accumulative total price setup device a reading is to be taken and entered into the RH accumulator of the machine.

The operation will be traced, assuming that relay coil Y had been energized and that the machine was operating with the problem shown on Fig. 37. Under these conditions the energization of relay coil Y will also close relay points Y—2 whereupon a circuit is established traced as follows. From the 301 side of the A. C. line, through cam contacts CC—6 which close at the proper time in the cycle, through relay points Y—2, through the S—2 selector magnet and back to ground. The energization of the S—2 selector magnet closes the related contact points 152 and 153 associated with this relay and establishes circuits from the TPRO—2 readout to a group of lines 324. The energization of the coil Y also closes relay points Y—3 establishing a supply circuit from the 301 side of the A. C. line to the emitter 162 which sends the usual impulses through the TPRO—2 readout through the contacts now closed to the 324 group of lines which extend down to the accumulator magnets of the RH accumulator designated 306RH. This operation will enter the amount of 420 into the RH accumulator. After the emitter 162 has sent out the impulses to the TPRO—2 readout the brush of the emitter encounters an extra spot and brings about the energization of a coil 168MC—4. The energization of this coil trips the MC—4—1 to 10 group of contacts to closed position. The MC—4—1 to 8 contacts are shown on Fig. 35c and are related with the MC—4RO readout. The MC—4—9 contact is shown on Fig. 35b and is related to the MP—3 hand setup rate device. The MC—4—10 contact is shown on Fig. 35b and is adapted to establish a circuit to relay magnet 168RH and relay coil K upon the brush of the emitter 164 encountering the extra spot. Concurrently with the energization of relay coil 168MC—4 (Fig. 35c) the relay coil N, which is in the same circuit, is energized, which coil upon being energized opens relay points N—1 (Fig. 35c), which breaks the stick circuit for relay coil E and also causes the de-energization of relay coil L and relay coil Y.

Concurrently with the entry of the amount from the TPRO—2 device into the RH accumulator, there is another entry of the consumption amount from the MC—1RO device into the unused left hand columns of the LH accumulator. This entry is effected in the following manner. Upon energization of relay coil L in the manner previously explained and before deenergization of L as just explained, relay points L—2 (Fig. 35d) which close, establish a circuit from the 301 side of the AC line to the emitter 165. Such emitter sends the usual impulses through the MC—1RO readout to a set of lines 325 and lead over to the four left hand accumulator magnets of the LH accumulator. The accumulator magnets of this accumulator are designated 306LH.

The machine is now ready to multiply the balance standing in MC—4 by the fixed multiplier of 7. The amount of 7 is the amount which has been set up on the MP—3 rate setup device.

Referring to Fig. 35b it will be appreciated that the brush of the MP—3 device is standing on the 7th spot having been positioned in this position by hand. Contacts RHC are closed at this time in the machine operation and a circuit is accordingly established from the 301 side of the AC line through RHC, through contacts MC—4—9 to the MP—3 hand setup device and out via the 7th wire of the 326 group to the X—7 multiplier relay magnet, which magnet becomes energized at the time cam contacts CC—8 close. Multiplication then proceeds in the usual way. The multiplying impulses being emitted at emitter 164 (Fig. 35b) through the LH and RH contacts of the X—7 multiplier relay to the LH component lines 327LH and to the RH component lines 327RH, thence to the MC—4RO multiplicand readout device which has a setting of 14 thereon according to the computation of Fig. 37, thence out through the MC—4—1 to 8 contacts which are now closed, to lines 328LH and 328RH and respectively into the LH and RH accumulators. The entry into the LH accumulator is through the three-blade contacts RH—1 to 5 which are in the position shown.

According to the computation of Fig. 37, the amount of 78 would be entered into the RH accumulator and accumulated with the amount of 420 previously standing therein and the amount of 20 would be entered into the LH accumulator Referring again to Fig. 35b, upon the brush of the emitter 164 encountering the extra spot a circuit is established through the MC—4—10 contact to the 168RH relay magnet and to relay coil K. The energization of 168RH trips to reverse position the contacts RH 1 to 5 and the energization of relay coil K opens relay points K—1 for a purpose to be hereinafter explained. The energization of 168RH also trips open contacts RHC (Fig. 35b) to prevent unwanted repeated multiplication.

The machine is now ready to transfer over the accumulation standing on the RH accumulator into the LH accumulator. This is brought about in the following manner. Contacts LHE are closed at this time being normally closed contacts and a supply circuit is established from the 301 side of the AC line to the emitter 166 which sends impulses through the RHRO readout device through the RH 1 to 5 contacts which are in reverse position at this time (the RH 1 to 5 contacts being shifted to reverse position following the energization of 168RH in the manner previously described) and allows the impulses to flow over to the related accumulator magnets of the LH accumulator. The operation of the emitter 166 causes the amount of 498 to be transferred over into the LH accumulator (see Fig. 37). The energization of 168RH (Fig. 35b) in the manner previously explained has also caused closure of contacts RHB (Fig. 35d). Upon the brush of emitter 166 encountering the leading spot a circuit is established to ground through the RHB contacts and through the reset magnets 329 to 334 inclusive which are the reset magnets of the MC—1 to MC—5 entry receiving devices and the IVC accumulator, 334 being the reset magnet of the IVC accumulator and 329 being the reset magnet for MC—1, etc. These MC receiving devices and the IVC accumulator are then reset in the usual way. Upon the brush of the emitter 166 encountering the extra or last spot, a circuit is established through contacts RHA which are closed upon the energization of 168RH in the manner previously explained to magnet 168LH and to ground. Energization of 168LH trips the contacts in the LH accumulator. Among these contacts is contact LHC (Fig. 35d).

The machine is now ready to read out the total result of the computation and punch it back upon the record card from which the quantities were originally derived. The machine also reads out the amount of the consumption which amount it will be recalled is set up on the four left hand columns of the LH accumulator. With contacts LHC closed and upon closure of cam contacts CC—9, relay coil B (Fig. 35d) becomes energized. The energization of B closes relay points B—1 and maintains a stick circuit for relay coil B. With relay points B—1 closed a circuit is established to the common strip of the punch through the contacts 215 and the brush 233 traverses the spots 221 in the manner previously explained, to supply current column by column to the LH readout and selectively energize the punch selector magnets 335. A circuit is also established to the punching magnet 337 through the punch magnet contacts 336. This punching magnet 337 and the punch contacts 336 are those customarily used in punching machines of this type. The final computed amount and the consumption are now punched upon the card. Upon the completion of punching and when the card in the punch has been traversed to beyond the last column position, contacts P—4 (see Fig. 35d) become closed. Upon closure of contacts CC—10 a circuit is established from the 301 side of the AC line, through P—4, CC—10, LHD which were previously closed to reset magnets 338 and 339 of the LH and RH accumulators. Such accumulators are reset in the usual manner.

The complete computation from one card has now been completed and the machine is ready to automatically begin a further computation on the succeeding card.

Upon closure of 168RH, contacts RHE (Fig. 35d) are closed and upon energization of 168LH, contacts LHB were closed. With the punched parts properly restored in position to receive a new card and with the punch control contacts P—1 closed, a circuit is accordingly established through the 302 side of the AC line, through P—1, RHE, LHB, through relay points C—2 now closed, through cam contacts FC—2 which are now closed, to card feed clutch magnet 71a back through contacts F—2 now closed, to the other side of the DC line. The energization of 71a initiates a new card feed and the computing operations are then repeated on the next card.

The manner of energization of coil F through card lever contacts 120 has been previously explained. The energization of F causes relay points F—4 (Fig. 35d) to close. Closure of these relay points causes energization of coil R and coil R upon being energized closes relay points R—1 to establish a stick circuit for relay coil R through relay points K—1 which are normally closed. The energization of R also opens up relay points R—2 to cut off undesired card feed cycles which might occur through the circuit through LHF, R—2, RHF during computing operations. At the time in the operation previously explained, relay coil K becomes energized which opens up relay points K—1 and breaks the circuit to relay points R to establish the possibility of a circuit through LHF, R—2, RHE. However, this circuit is not used for starting up on a second card feed because at such time contacts RHF and LHF are open. However, upon a new card run with cards being first introduced in the magazine, such contacts RHF would be closed. In short, the circuit through LHF, R—2 and RHF is only used when first starting up the machine when cards are first placed in the magazine. For running operations upon subsequent cards of a group, the circuit is through LHB and RHE.

The operations need not be traced for all of the various other alternative computations. It will be understood that upon energization of relay coil W, relay points W—3 will close to supply current to emitter 161, that emitter 163 is supplied through relay points Z—3, that energization of W will close relay points W—2 to cause energization of magnet S—1 which effects a closure of the contacts 152 and 153 associated with S—1, that energization of Z will close relay points Z—2, energize relay coil S—3 and close the corresponding set of 152 and 153 contacts.

It will be further understood that the energization of 168MC—3 will bring about closure of MC—3—1 to 10 contacts, that 168MC—2 will close the contacts MC—2—1 to 10 contacts and that closure of 168MC—5 will bring about closure of the MC—5—1 to 10 contacts.

One further operation may however, be explained. Referring to Fig. 38, it will be noted that in this computation that there is no readout of an accumulative total price. There is no such readout of accumulative total price because the consumption is 19 which is under 20 kwh., the amount of the first rate schedule. Under such a computation, relay coil V would become energized in the manner previously explained, because of the brush of the MC—2RO readout standing on the zero spot. The energization of relay coil V (Fig. 35c) would cause closure of relay points V—1 and a circuit would be established from the 301 side of the line through relay points V—1, through cam contacts CC—7 which close at the proper time in the cycle, through relay magnet 168MC—2 and back through relay coil N to ground. The 168 magnets where accumulative total prices are to be entered are usually energized by the emitters 161, 162 or 163. However, when no total price is to be accumulated the 168MC—2 magnet and magnet N are energized by the closure of cam contacts CC—7 with relay points V—1 closed. With this kind of a computation accordingly, there will be no total price accumulated into the RH accumulator.

Referring to the timing diagram, this timing diagram shows the condition with the machine running and does not show the extra cycles required on starting up the machine. The first two counter cycles delineated on Fig. 36 show a card feed cycle. In the first counter cycle the various factor amounts are read from the card. On the second counter cycle there is a readout from the IVC counter into the MC—1 through 5 entry devices. On the third counter cycle complements of accumulative consumption amounts are entered into MC—3, MC—4 and MC—5 entry receiving devices. At the end of this cycle the zero spots are sensed to determine further operations of the machine. This is indicated by the time of closure of cam contacts CC—4 and CC—5. During the next counter cycle which is the first cycle delineated on Fig. 36a, there is a readout of accumulative total price into the RH accumulator and in this same cycle there is also a readout from the MC—1 entry receiving device into the four left hand columns of the LH accumulator. During the next counter cycle, the second on Fig. 36a, multiplication occurs. On the last counter cycle on Fig. 36a there is a transfer from RH to LH accumulator and various resetting operations occur as shown. Following this cycle, punching of the consumption and product occurs. A new card feed cycle also is initiated simultaneously with the punching operation. If at the end of the card feed cycle, punching is not completed, further operation of the machine will be delayed until such punching is finished and the card is ejected.

Various forms of relay devices are used in the present machine. Some of the relays are purely electrical relays such as the relays with coils W, Y and Z and contacts W—2, Y—2 and Z—2. Other relays are of the electromagnetically tripped but mechanically controlled and restored multi-contact type. Such relays are those used for multiplier selection and column shift purposes and are such as are shown in Figs. 7 to 13 inclusive. Other relays of the general type shown in Figs. 27 to 30 inclusive are of the electromagnetically tripped and mechanically restored and re-latched type.

I claim:

1. An accounting machine for effecting sliding scale computation, comprising in combination, a plurality of accumulators, means for entering a plurality of values therein, schedule amount manifesting means pre-set according to a schedule of comparison amounts, means for causing deduction of the comparison amounts from the values standing in the accumulators and for obtaining up remainder amounts of varying magnitude, means for detecting the smallest true remainder amount, entry receiving devices for various sliding scale multipliers, amount manifesting means pre-set to represent scheduled pre-computed amounts, result accumulating means, means controlled by the smallest remainder amount detecting means, for selecting a pre-set pre-computed amount and for causing the entry thereof into the result accumulating means of the machine, a plurality of devices set to represent different multiplier values, means brought into operation following the aforesaid pre-computed amount entering operation for selecting one of the multipliers available on the representing devices and means for multiplying the detected real remainder amount by such selected multiplier and for entering the resulting product into the result accumulating means of the machine.

2. An accounting machine for effecting computations and multiplication on data according to a sliding scale, comprising set up devices for receiving predetermined multipliers for receiving predetermined multiplicand comparison amounts, and for receiving pre-computed product amounts according to sliding scale schedules, a plurality of value entry receiving means upon which a value is set up, multiplying means, result receiving means, means for entering the multiplicand comparison amounts from their set up means into the aforesaid value entry receiving means and for obtaining a series of remainders therein, means for detecting the smallest positive remainder, means controlled by said detecting means for selecting one of said pre-computed product set up means, means for entering the pre-computed product from the selected pre-computed product set up means into the result receiving means, and means controlled by said detecting means for selecting a multiplier to be used with the aforesaid detected remainder and for causing the multiplying means to multiply such selected multiplier and the detected remainder and to enter the product thereof into the result receiving means.

3. An accounting machine having result receiving means, a series of multiplicand entry receiving devices upon which identical multiplicand amounts may be set up, set up devices for a plurality of sliding scale multipliers, set up devices for a plurality of multiplicand comparison amounts, which set up devices are settable according to accumulative totals of such amounts, a plurality of product set up devices, the first of which has set up thereon a simple product of the first multiplier and the first multiplicand comparison amount and the second of which is set according to the product of the second multiplier and the second multiplicand comparison amount plus the first product and the other of said devices being similarly set, means for subtractively entering amounts from the various multiplicand comparison set up devices into the corresponding multiplicand entry devices to obtain a series of remainders, means to determine which remainder is the smallest real number, selective means under control of the aforesaid determining means to cause a selection of the corresponding product set up devices and the entry therefrom of the amount set up into the result receiving means, means under the control of the last mentioned means for selecting the corresponding sliding scale multiplier and corresponding remainder and for causing the multiplication thereof and for entering such product into the result receiving means.

4. An accounting machine for effecting computations and multiplication according to a sliding scale of amounts, including pre-computed amount manifesting means from which a selected pre-computed amount may be derived, other amount manifesting means for a plurality of related multipliers, a plurality of accumulators for another value to be used in the computation, comparison amount manifesting means for a plurality of pre-set comparison amounts, multiplying means and a final result receiving means, means for obtaining the differences between said other value and the pre-set comparison amounts in said accumulators, means for testing the differences so obtained and for selecting the smallest positive difference and the multiplier which is to multiply such difference, and for also selecting one of the plurality of pre-computed amounts which is related to the multiplier selected, means for entering in the result receiving means the aforesaid selected pre-computed amount and means for causing the multiplying means to multiply the selected multiplier by the selected difference amount and for causing the entry of the product thereof into the result receiving means.

5. The invention set forth in claim 4 wherein means is provided for eliminating the selection and entry of any of the plurality of pre-computed amounts when the value introduced in said accumulators is less than the smallest of the pre-set comparison amounts and for causing said multiplying means to enter into the final result receiving means the product of such value by the selected multiplier.

6. A record controlled accounting machine including record handling means for handling, and record reading means for reading each of a series of records which pass through the machine, a plurality of entry receiving means controlled by said reading means, amount manifesting means for pre-set numerical data, means for causing the pre-set numerical data to be subtracted from the entry upon the entry receiving means whereby a series of remainder amounts are obtained in said multiple entry receiving means from which a remainder may be selected for further computation, means to select the smallest positive remainder for multiplication, means upon which a sliding scale of multipliers may be set up, each multiplier being related to one of said entry receiving means, means to effect a selection of a multiplier corresponding to the entry receiving device containing the selected remainder, and multiplying means for effecting multiplication of said selected remainder by the selected multiplier.

7. An accounting machine for multiplying a selected amount by a selected one of a number of multipliers, including multiplying means, multiple means for representing a plurality of multipliers, a plurality of receiving means containing a series of numbers of diminishing magnitude, means to select the receiving means containing the smallest positive amount, the amount in said selected receiving means being utilized as the multiplicand, means for selecting a multiplier from the aforesaid plurality of multipliers for controlling the operation of the multiplying means, said selecting means including associated means to effect multiplier selection automatically according to the selected receiving means which contains the multiplicand.

8. A record controlled accounting machine with means for handling a series of records in succession, record controlled entry receiving accumulators, amount manifesting means for a series of sliding scale multipliers, amount manifesting means for a pre-set schedule of comparison amounts, means to cause subtraction from the amounts upon the accumulators of the pre-set comparison amounts to obtain a series of differences, means to select the smallest positive difference by selecting the accumulator containing said difference, means to select a multiplier from the manifested set of sliding scale multipliers by selecting the manifesting means which is related to the accumulator containing the selected difference, a result accumulator and means to multiply the selected difference by the selected multiplier and for entering the result of the multiplication in said result accumulator.

9. A machine according to claim 8 wherein plural settable amount manifesting means are provided to represent a plurality of scheduled pre-computed amounts and wherein said first mentioned selecting means causes a selection of one of said manifesting means for controlling entry of the amount manifested thereon into said result accumulator, and means for effecting entry of said manifested amount in said result accumulator.

10. A multiplying machine including multiplying devices, a plurality of manifesting means from which one of a plurality of multiplier factors may be derived for use in a multiplying computation, a plurality of accumulators each receiving the same initial entry from which a variable multiplicand factor may be derived, settable means pre-set in accordance with predetermined multiplicand comparison values, means for subtracting the multiplicand comparison values from the initial entry in said accumulators and for ascertaining the relative magnitude of said entry with respect to the predetermined multiplicand values in said settable means, means for selecting one of said accumulators and one of said multiplier factor manifesting means under control of said ascertaining means for a multiplying operation and means to automatically bring about multiplication by the multiplying devices upon such selection.

11. A multiplying machine including multiplying means, representing means to represent a plurality of multiplier factors, a selected one of which is to be used in a multiplication, means representing a plurality of other values of increasing magnitude, one of which is utilized as a multi-denominational multiplicand, cyclically operable means, means called into operation by said cyclically operable means to automatically select one of said other values as a multiplicand by selecting the representing device therefor, and to automatically select any one of said multiplier factors by selecting the representing device therefor, said selecting means including devices to test said values of increasing magnitude and to determine the smallest positive one of them.

12. A record controlled accounting machine including means to derive two amounts from a common record, a plurality of accumulators for receiving one of said amounts and a receiving device for receiving the other amount, means to cause said other amount to be subtracted from the first amount and the remainder to be set up upon said accumulators, means for representing a set of comparison amounts, means to ascertain the relative magnitude of the remainder on said accumulators with respect to said set of comparison amounts, representing means from which any one of a plurality of multiplier factors may be derived, multiplying means, means controlled by said ascertaining means for selecting one of said accumulators and one of said multiplier factor representing means for controlling said multiplying means in a multiplying operation, and means to bring about a multiplying operation upon completion of such selection.

13. A multiplying machine including multiplying means, means for controlling the operation thereof including multiple devices for representing different amounts one of which may be utilized as a multi-denominational multiplicand, means for causing set up of said amounts on said devices, devices upon which a plurality of different multiplier factor amounts are available, means for testing said different amounts standing on the representing devices and means controlled by said testing means for selecting any one of the plurality of different multiplier factors for use in the multiplying computation by selecting any one of said last mentioned devices for controlling operation of the multiplying means, cyclically operable means, and means controlled thereby for causing automatic operation of said selecting means and said multiplying means after said different amounts are set up.

14. A machine according to claim 13 wherein the devices upon which different multiplier factors are available comprise manually settable means for setting up the different multiplier factor amounts prior to factor selection.

JAMES W. BRYCE.